US008073196B2

(12) United States Patent
Yuan et al.

(10) Patent No.: US 8,073,196 B2
(45) Date of Patent: Dec. 6, 2011

(54) DETECTION AND TRACKING OF MOVING OBJECTS FROM A MOVING PLATFORM IN PRESENCE OF STRONG PARALLAX

(75) Inventors: Chang Yuan, Vancouver, WA (US); Gerard Medioni, Los Angeles, CA (US); Jinman Kang, San Jose, CA (US); Isaac Cohen, Minnetonka, MN (US)

(73) Assignee: University of Southern California, Los Angeles, CA (US)

( * ) Notice: Subject to any disclaimer, the term of this patent is extended or adjusted under 35 U.S.C. 154(b) by 1040 days.

(21) Appl. No.: 11/873,390

(22) Filed: Oct. 16, 2007

(65) Prior Publication Data
US 2008/0273751 A1   Nov. 6, 2008

Related U.S. Application Data

(60) Provisional application No. 60/852,245, filed on Oct. 16, 2006.

(51) Int. Cl.
*G06K 9/00* (2006.01)

(52) U.S. Cl. .......................... 382/103; 382/236; 348/169

(58) Field of Classification Search .................. 382/103, 382/236; 348/169
See application file for complete search history.

(56) References Cited

U.S. PATENT DOCUMENTS

| | | | | |
|---|---|---|---|---|
| 6,353,678 B1 * | 3/2002 | Guo et al. | ..................... | 382/154 |
| 6,360,017 B1 * | 3/2002 | Chiu et al. | ..................... | 382/239 |
| 6,473,536 B1 * | 10/2002 | Chiba et al. | .................... | 382/284 |
| 6,597,818 B2 * | 7/2003 | Kumar et al. | ................. | 382/294 |
| 2003/0103647 A1 * | 6/2003 | Rui et al. | ...................... | 382/103 |
| 2004/0109585 A1 * | 6/2004 | Tao et al. | ...................... | 382/106 |
| 2005/0063608 A1 * | 3/2005 | Clarke et al. | .................. | 382/284 |
| 2005/0201612 A1 * | 9/2005 | Park et al. | ..................... | 382/154 |
| 2005/0286767 A1 * | 12/2005 | Hager et al. | .................. | 382/190 |

OTHER PUBLICATIONS

Astrom et al.; "Generalised epipolar constraints"; International Journal of Computer Vision 33(1), 51-72, Sep. 1999.*
Kang et al., "Detection and Tracking of Moving Objects from a Moving Platform in Presence of Strong Parallax," Proceedings of the IEEE International Conference on Computer Vision ICCCV'05, Beijing, China, Oct. 17-20, 2005, 8 pages, http://iris.usc.edu/~icohen/./pdf/Jinman-iccv05.pdf. [accessed on Jan. 29, 2009].

(Continued)

*Primary Examiner* — Vikkram Bali
*Assistant Examiner* — Eueng-Nan Yeh
(74) *Attorney, Agent, or Firm* — Fish & Richardson P.C.

(57) ABSTRACT

Among other things, methods, systems and computer program products are described for detecting and tracking a moving object in a scene. One or more residual pixels are identified from video data. At least two geometric constraints are applied to the identified one or more residual pixels. A disparity of the one or more residual pixels to the applied at least two geometric constraints is calculated. Based on the detected disparity, the one or more residual pixels are classified as belonging to parallax or independent motion and the parallax classified residual pixels are filtered. Further, a moving object is tracked in the video data. Tracking the object includes representing the detected disparity in probabilistic likelihood models. Tracking the object also includes accumulating the probabilistic likelihood models within a number of frames during the parallax filtering. Further, tracking the object includes based on the accumulated probabilistic likelihood models, extracting an optimal path of the moving object.

24 Claims, 27 Drawing Sheets

OTHER PUBLICATIONS

Barron, J.L., "Performance of optical flow techniques," International Journal of Computer Vision 12(1): 43-77 (1994) (the year of publication is sufficiently earlier than the effective US filing date and any foreign priority date so that the particular month of publication is not in issue).

Fischler, M.A. and R.C. Bolles, "Random sample consensus: A paradigm for model fitting with applications to image analysis and automated cartography," Communications of ACM, vol. 24, No. 6, pp. 381-395 (1981) (the year of publication is sufficiently earlier than the effective US filing date and any foreign priority date so that the particular month of publication is not in issue).

Fusiello, A. et al., "View synthesis from uncalibrated images using parallax," In Proc. of ICIAP, pp. 146-151, 2003 (the year of publication is sufficiently earlier than the effective US filing date and any foreign priority date so that the particular month of publication is not in issue).

Hartley, R., "In defence of the 8-point algorithm," In Proc. of ICCV, pp. 1064-1070, 1995 (the year of publication is sufficiently earlier than the effective US filing date and any foreign priority date so that the particular month of publication is not in issue).

Irani, M. and P. Anandan, "A unified approach to moving object detection in 2d and 3d scenes," IEEE Transactions on Pattern Analysis and Machine Intelligence, vol. 20, No. 6, pp. 577-589, 1998 (the year of publication is sufficiently earlier than the effective US filing date and any foreign priority date so that the particular month of publication is not in issue).

Irani, M. and P. Anandan, "Direct recovery of planar-parallax from multiple frames," IEEE Transactions on Pattern Analysis and Machine Intelligence, vol. 24, No. 11, pp. 1528-1534, 2002 (the year of publication is sufficiently earlier than the effective US filing date and any foreign priority date so that the particular month of publication is not in issue).

Kang, J. et al., "Continuous tracking within and across camera streams," in Proceedings of the 2003 IEEE Computer Society Conference on Computer Vision and Pattern Recognition (CVPR'03), pp. 267-272, 2003 (the year of publication is sufficiently earlier than the effective US filing date and any foreign priority date so that the particular month of publication is not in issue).

Kumar, R. et al., "Direct recovery of shape from multiple views: A parallax based approach," in Proc. of ICPR, pp. 685-688, 1994 (the year of publication is sufficiently earlier than the effective US filing date and any foreign priority date so that the particular month of publication is not in issue).

Pless, R. et al., "Detecting independent motion: The statistics of temporal continuity," IEEE Transactions on Pattern Analysis and Machine Intelligence, vol. 22, No. 8, pp. 768-773, 2000 (the year of publication is sufficiently earlier than the effective US filing date and any foreign priority date so that the particular month of publication is not in issue).

Sawhney, H., "3d geometry from planar parallax," In Proc. of IEEE Computer Society Conference on Computer Vision and Pattern Recognition, pp. 929-934, 1994 (the year of publication is sufficiently earlier than the effective US filing date and any foreign priority date so that the particular month of publication is not in issue).

Sawhney, H.S. et al., "Independent motion detection in 3d scenes," IEEE Transactions on Pattern Analysis and Machine Intelligence 22(10): 1191-1199, 2000 (the year of publication is sufficiently earlier than the effective US filing date and any foreign priority date so that the particular month of publication is not in issue).

Shashua, A. and N. Navab, Relative affine structure: Canonical model for 3d from 2d geometry and applications, IEEE Transactions on Pattern Analysis and Machine Intelligence, 18(9): 873-883, 1996 (the year of publication is sufficiently earlier than the effective US filing date and any foreign priority date so that the particular month of publication is not in issue).

Torr, P.H.S., "Geometric motion segmentation and model selection," Philosophical Trans. R. Soc. Lond. A. : Mathematical, Physical and Engineering Sciences, 356 (1740): 1321-1340, 1998 (the year of publication is sufficiently earlier than the effective US filing date and any foreign priority date so that the particular month of publication is not in issue).

* cited by examiner (a) The pipeline (b) Geometric constraint validation from four frames

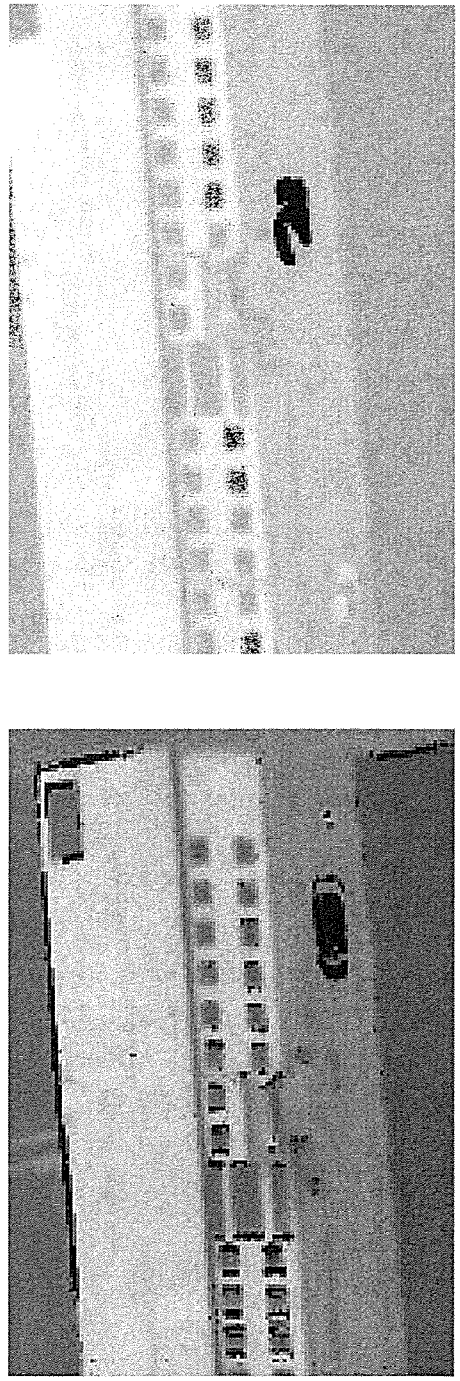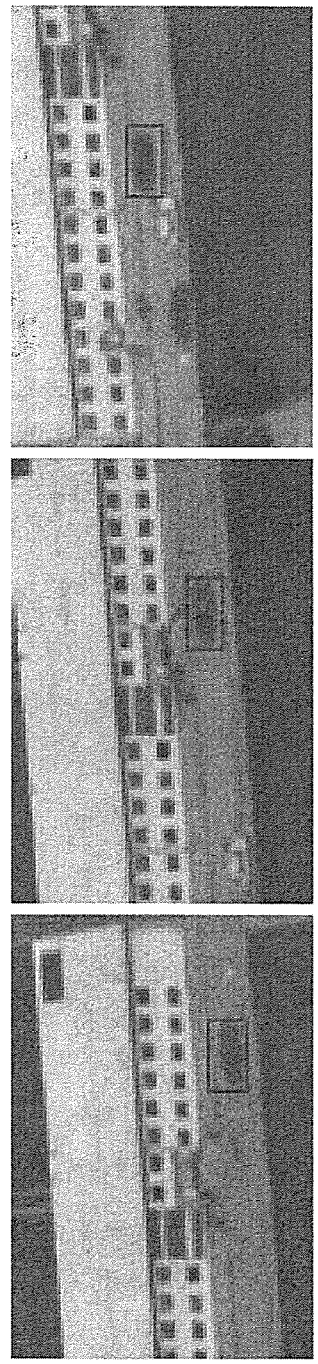
(a) Initially detected blobs (b) Filtered blobs (c) Tracking results
FIG. 7

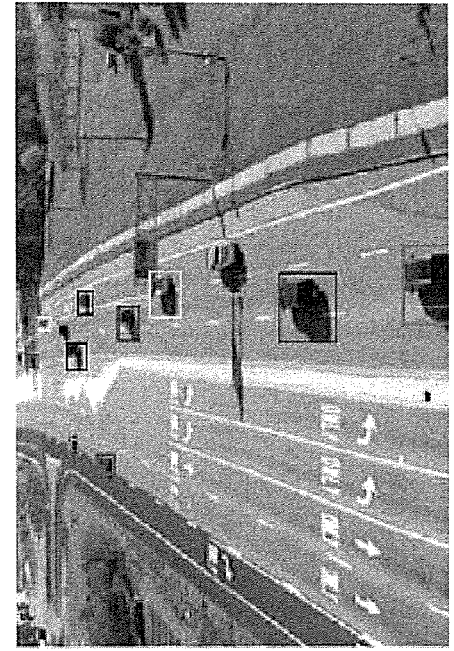
(a) Initially detected blobs  (b) Filtered blobs  (c) Tracking results
FIG. 8

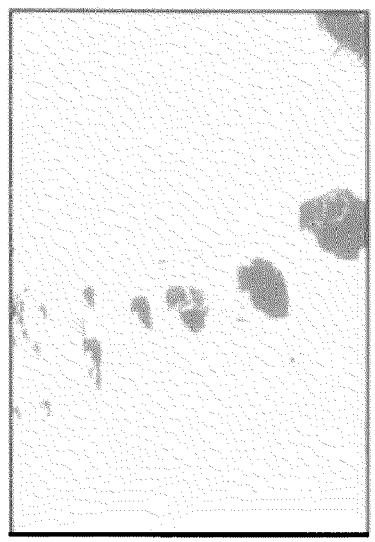
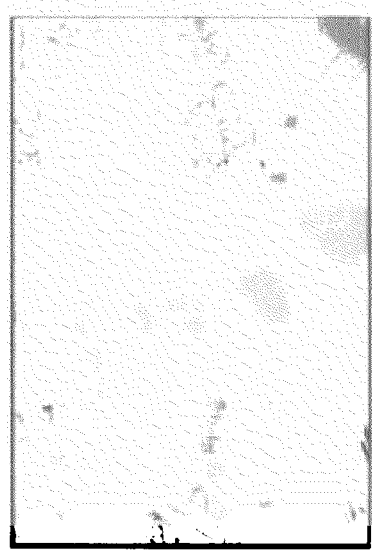
FIG. 18C
FIG. 18B
FIG. 18A

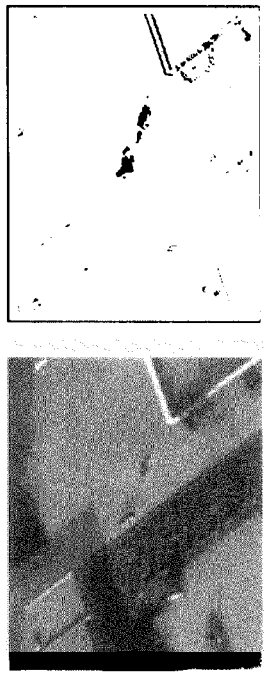
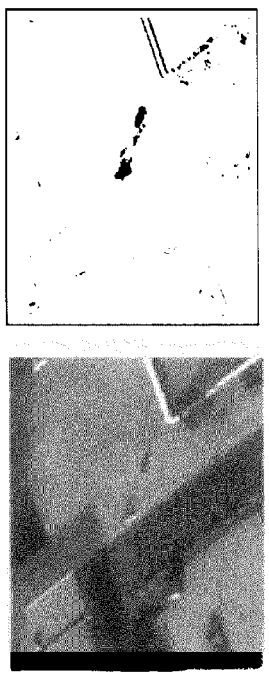
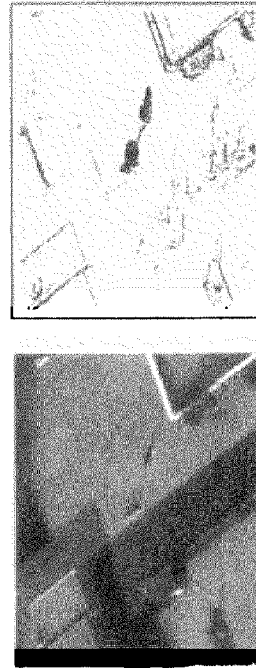
FIG. 19A4   FIG. 19B4   FIG. 19C4
FIG. 19A3   FIG. 19B3   FIG. 19C3
FIG. 19A2   FIG. 19B2   FIG. 19C2
FIG. 19A1   FIG. 19B1   FIG. 19C1

FIG. 20A1  FIG. 20A2  FIG. 20A3  FIG. 20A4
FIG. 20B1  FIG. 20B2  FIG. 20B3  FIG. 20B4
FIG. 20C1  FIG. 20C2  FIG. 20C3  FIG. 20C4

DETECTION AND TRACKING OF MOVING OBJECTS FROM A MOVING PLATFORM IN PRESENCE OF STRONG PARALLAX

CLAIM OF PRIORITY

This application claims priority under 35 U.S.C. §119(e) to U.S. Patent Application Ser. No. 60/852,245, filed on Oct. 16, 2006, the entire contents of which are incorporated by reference as part of the specification of this application.

FEDERALLY SPONSORED RESEARCH OR DEVELOPMENT

This invention was made with government support under Contract No. MDA904-03-C-1786 awarded by the Maryland Procurement Office. The government has certain rights in the invention.

TECHNICAL FIELD

This application relates to detection and tracking of independently moving objects from a scene.

BACKGROUND

Detection and tracking of independently moving objects from a scene can be important in video surveillances, for example. When images are captured using a moving camera, the detection and tracking problems can become more complex because the camera motion tend to induce a motion in all pixels of the image. Some conventional approaches for detecting moving regions may rely on the stabilization due to the camera motion using parametric motion models and defining moving pixels as the ones that have not been stabilized. In addition, other conventional approaches in motion detection and tracking may assume that the scene can be approximated by a plane (i.e. a flat ground), and thus, image transformation tend to be modeled as a 2D affine or projective transformation.

SUMMARY

In one aspect, detecting motion in a sequence of video frames includes identifying residual pixels from the sequence of video frames to provide estimated indication of a moving object or a static three-dimensional (3-D) structure. The identified residual pixels are sorted to isolate pixels that correspond to the moving object. Sorting the residual pixels include applying at least two geometric constraints to the identified one or more residual pixels. The at least two geometric constraints represent at least a variation in relative depth of the residual pixels. A disparity of the residual pixels to the applied at least two geometric constraints is detected. Based on the detected disparity the residual pixels are filtered to remove pixels that do not correspond to the moving object.

In another aspect, detecting a moving object in a scene includes identifying one or more residual pixels from video data. At least two geometric constraints are applied to the identified one or more residual pixels. A disparity of each residual pixel to the applied at least two geometric constraints is calculated. Based on the detected disparity, each residual pixel is classified as belonging to either parallax or independent motion. Further, a moving object is tracked in the video data. Tracking the object includes representing the detected motion pixels in probabilistic likelihood models. Tracking the object also includes accumulating the probabilistic likelihood models within a number of frames computed by the parallax filtering. Further, tracking the object includes based on the accumulated probabilistic likelihood models, extracting an optimal path of each moving object.

Implementations can optionally include one or more of the following features. Identifying the one or more residual pixels can include performing affine-based motion compensation and detection on the sequence of video frames. Alternatively, identifying the one or more residual pixels can also include performing homography based motion detection. Tracking a moving object can include using a spatiotemporal JPDAF. Implementations can optionally include applying an epipolar constraint including: generating a first set of two epipolar lines derived from optical flows. In addition, a second set of two epipolar lines derived from a fundamental matrix; can be applied. Further, an average angular difference between the first and second sets of epipolar lines can be calculated to generate an angular difference map.

Also, implementations can optionally include one or more of the following features. Applying the at least two geometric constraints can include applying a structure consistency constraint. Applying the structure consistency constraint includes generating at least a pair of relative depth maps for the one or more residual pixels. Applying the structure consistency constraint can also include deriving a bilinear relationship between the generated at least a pair of relative depth maps. Further, applying the structure consistency constraint can include comparing the one or more residual pixels with the derived bilinear relationship to determine whether the one or more residual pixels conform to the derived bilinear relationship. Also, identifying the one or more residual pixels can include performing affine-based motion compensation and detection. The affine based motion compensation and detection can include extracting a number of feature points in each frame of the video data; matching the feature points in consecutive frames; and estimating a 2D affine motion model, as a special case of 2D homography models. Further, extracting a number of feature points is performed by using the Harris corner detector.

In another aspect, a pipeline processor includes a geometric constraint estimation stage to perform an estimation of multi-view geometric constraints based on feature point correspondences extracted from a sequence of video frames. The pipeline includes a homography (affine)-based image detection stage to compute a background model image, and identify one or more residual pixels in the sequence of video frames based on inconsistencies with the background model. Further, the system includes a parallax filtering stage to filter out parallax pixels from the residual pixels by applying one or more outlier detection methods to disparity values with respect to each geometric constraint.

The subject matter described in this specification potentially can provide one or more of the following advantages. Techniques as described in this specification can utilize a second geometric constraint to enable removal of the epipolar ambiguity. Thus, the scene structure in the Euclidean world coordinate system remains constant. This structure consistency constraint can be implemented within a "Plane+Parallax" framework that represents the scene structure by a 2D residual displacement (parallax) field with respect to a 3D reference plane. The magnitude of each parallax displacement is directly related to projective structure, i.e. relative depth. If a pair of 2D points correspond to the same static 3D point, their relative depths are constrained by the structure consistency. The deviation from this constraint indicates that the point belongs to an independently moving object. This provides an additional cue for pixel classification.

In another aspect, detecting motion in a sequence of video frames include identifying from the sequence of video frames pixels associated with an object in actual motion or a static object in apparent motion. The identified pixels are processed to isolate the pixels associated with actual motion. Isolating the pixels includes detecting a variation in relative depth of each identified pixels. In addition, based on the detected variation, pixels that exceed a level of variation associated with the static structure are identified. Those pixels that do not exceed the level of variation associated with the static structure are filtered out.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification.

BRIEF DESCRIPTION OF THE DRAWINGS

FIGS. 7(a), 7(b) and 7(c) show a sequence of frames containing very strong parallax due to the large proximity of the camera to large structures in the scene.

FIGS. 8(a), 8(b) and 8(c) show sequence of frames containing a large amount of parallax caused by an UAV flying at very low altitude.

FIGS. 18A, 18B and 18C compare disparity maps with respect to three different geometric constraints: the epipolar constraint, the structure consistency constraint, and the trilinear constraint.

FIGS. 19A1, 19A2, 19A3, 19A4, 19B1, 19B2, 19B3, 19B4, 19C1, 19C2, 19C3 and 19C4 show another video sequence shot by an infrared airborne sensor, called "seq29."

FIGS. 20A1, 20A2, 20A3, 20A4, 20B1, 20B2, 20B3, 20B4, 20C1, 20C2, 20C3 and 20C4 show experimental results of a video sequence shot by a handheld camera, called "Tutor Hall".

Like reference symbols and designations in the various drawings indicate like elements.

DETAILED DESCRIPTION

Figure 1:
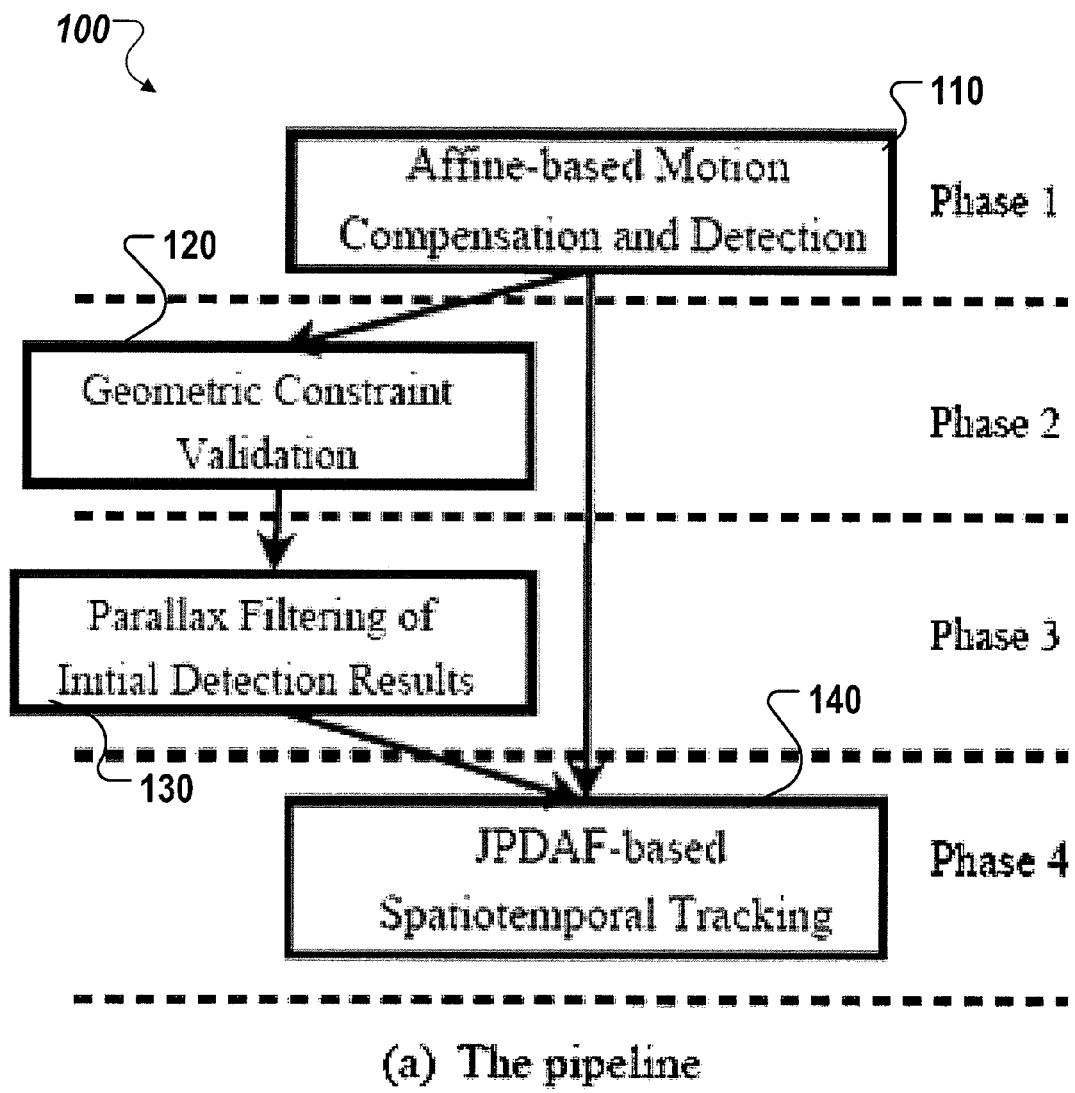
FIG. 1 is a block diagram of a pipeline 100 process for detecting and tracking independently moving regions in a 3D scene observed by a moving camera in the presence of strong parallax.

A sequence of video image frames captured using a moving camera (i.e., non-stationary) provides a complex challenge in motion detection. The motion of the camera itself can add a layer of complexity in detecting the moving objects in the sequence. The sequence of video image frames captured by the moving camera may contain multiple objects moving rigidly in a static background. The background may also contain a strong parallax produced by large 3D structures. In general, parallax or motion parallax describes an apparent motion (not actual) of an object against a background due to the motion of the observer. The camera views the scene through a perspective projection while undergoing general 3D motion.

The subject matter described in this specification enables the video frames to be segmented into a static background and a number of motion regions. The video frames are initially processed to compensate for the movements of the camera that captured the video frames. Then the remaining (residual) pixels are sorted into the static and motion regions utilizing various geometric constraints. The pixels corresponding to a static structure (e.g., a 3-D structure such as a building) are filtered out to isolate those pixels associated with the motion regions (e.g., a moving object).

A large number of applications could benefit from the proposed methodology, including video surveillance, object tracking, robot navigation, and video compression. Motion detection in dynamic video scenes is inherently difficult, as the moving camera induces 2D motion for each pixel. Consequently, the apparent pixel motion of points in moving objects is generated by both the independent object motion and the camera motion. In contrast, the apparent motion of points in a static background is strictly due to the camera motion. The camera motion results in a number of multiview geometric constraints, which are applied to the motion detection task: Those consistent with the constraints.

Techniques are described for detecting and tracking independently moving regions in a 3-dimensional (3D) scene observed by a moving camera in the presence of strong parallax. Detected moving pixels are classified into independently moving regions or parallax regions by analyzing two geometric constraints: (1) an epipolar constraint, and (2) a structure consistency constraint. The structure consistency constraint is implemented within a "Plane+Parallax" framework and represented by a bilinear relationship which relates the image points to their relative depths. This newly derived relationship is related to a trilinear tensor, but can be enforced into more than three frames. It does not assume a constant reference plane in the scene and therefore eliminates the need for manual selection of a reference plane. In addition, a robust parallax filtering scheme is implemented to accumulate the geometric constraint errors within a sliding window and estimate a likelihood map for pixel classification. The likelihood map is integrated into our tracking framework based on the spatiotemporal Joint Probability Data Association Filter (JP-DAF). This tracking approach infers the trajectory and bounding box of the moving objects by searching the optimal path with maximum joint probability within a fixed size of buffer. The performance of the tracking approach is described for real video sequences where parallax effects are significant.

FIG. 1 is a block diagram of a pipeline 100 process for detecting and tracking independently moving regions in a 3D scene observed by a moving camera in the presence of strong parallax. Video images captured by a moving camera is processed using the pipeline 100 that includes four phases 110, 120, 130 and 140. The first phase 110 of the pipeline 100 operates to apply an affine motion compensation and detection framework to consecutive frames of the captured video images. The residual pixels of the video image correspond either to parallax or independently moving regions. In order to identify independent motion in the initial detection results, the geometric constraint errors after four consecutive frames are estimated. During the second phase 120, geometric constraint validation is performed. The third phase 130 of the pipeline includes parallax filtering of initial detection results. The fourth phase 140 includes JPDAF-based Spatiotemporal tracking.

During the parallax filtering process (phase 3) 130, the constraint errors are accumulated within a buffer and represented in probabilistic likelihood models. Multiple cues from appearance, motion of detected blobs and the likelihood maps from parallax filtering are integrated into a JPDAF-based multi-frame tracking model during the fourth phase 140 of the pipeline. The pipeline 100 processing follows a transition from two-frame processing (phase 1) to four-frame processing (phase 2) and finally to the multi-frame processing (phase 3 and 4).

Figure 2A:
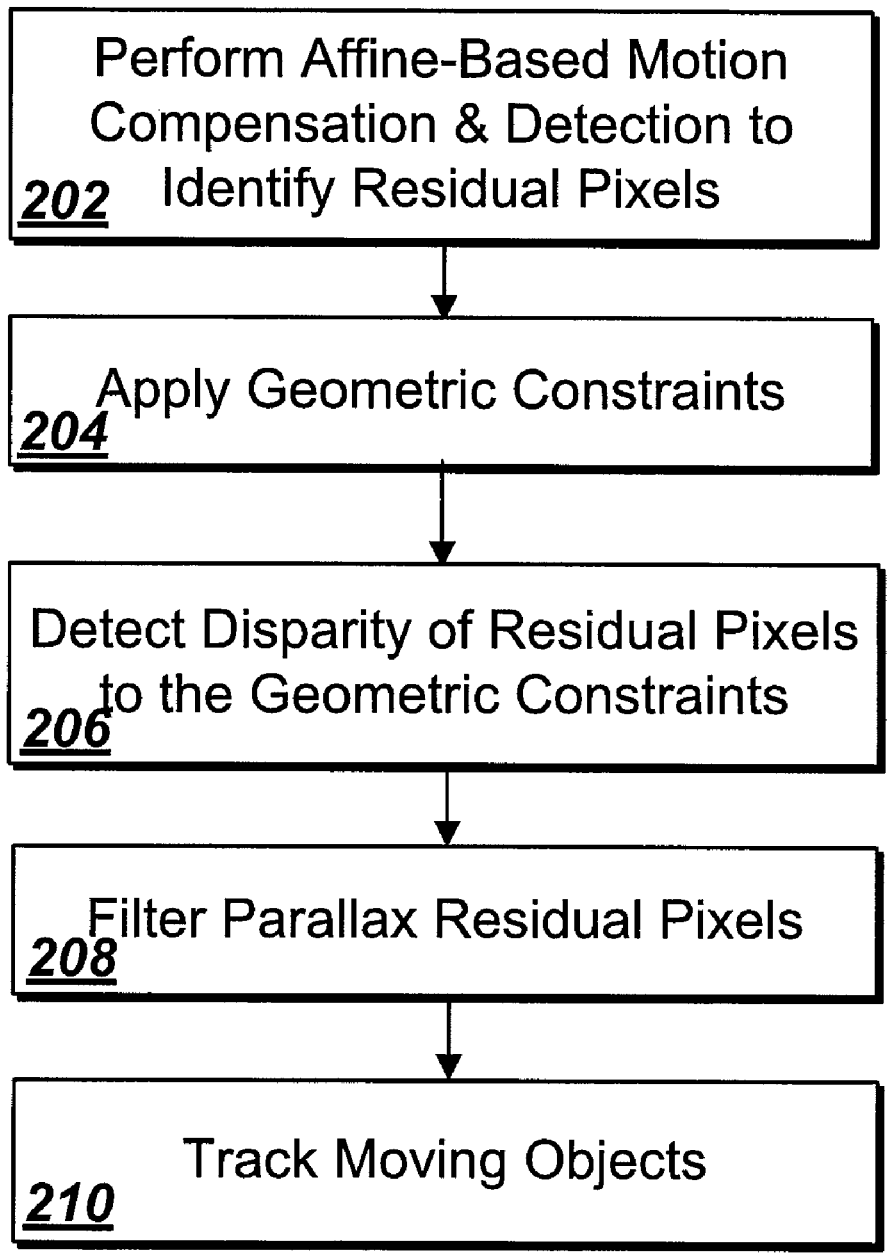
FIG. 2A is a process flow diagram of an example process 200 for detecting and tracking independently moving objects in a scene.

FIG. 2A is a process flow diagram of an example process 200 for detecting and tracking independently moving objects in a scene. One or more residual pixels are identified 202 by performing affine-based motion compensation and detection on two or more consecutive frames of video data. At least two geometric constraints are applied 204 to the identified one or more residual pixels. A disparity of the one or more residual pixels to the applied at least two geometric constraints is detected 206. Based on the detected disparity, the one or more residual pixels are classified as belonging to parallax or independent motion, and the residual pixels classified as parallax are filtered 208. Further, a moving object in the video data is tracked 210. Tracking the moving object includes: (1) representing the detected disparity in probabilistic likelihood models; (2) accumulating the probabilistic likelihood models within a number of frames during the parallax filtering; and (3) based on the accumulated probabilistic likelihood models, extracting an optimal path of the moving object.

Figure 2B:
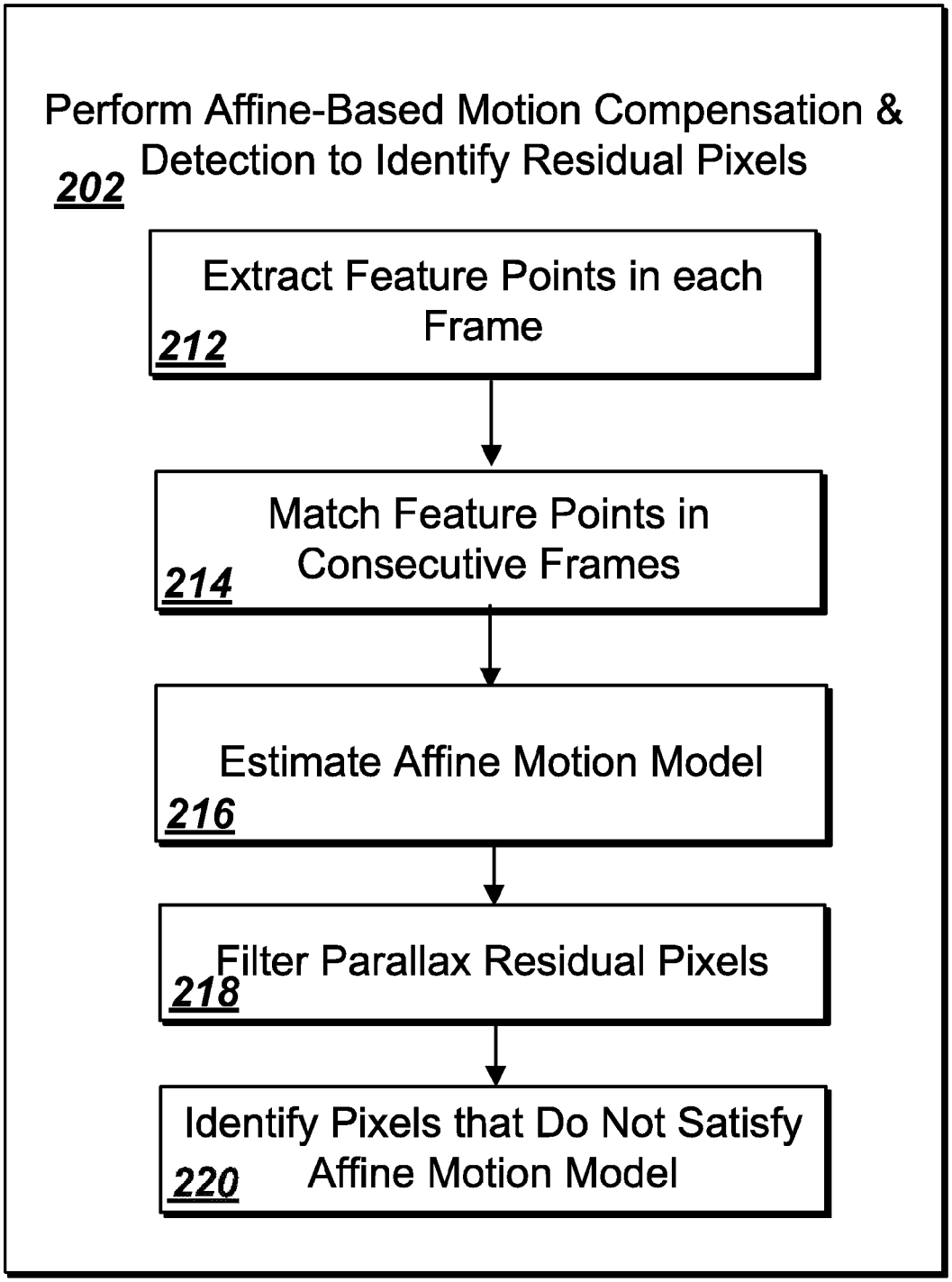
FIG. 2B is a process flow diagram of an example process 202 for affine motion compensation and detection (phase 1 of the pipeline).

FIG. 2B is a process flow diagram of an example process 202 for affine motion compensation and detection (phase 1 of the pipeline). The affine motion detection framework of the first phase 110 initially extracts 212 a number of feature points in each frame by using the Harris corner detector. Then the feature points in consecutive frames $I_t$ and $I_{t+1}$ are matched 214 by evaluating the cross-correlation of local windows around feature points. A 2D affine motion model $A_t^{t+1}$ is robustly estimated 216 by fitting the model to at least three pairs of matched points within a RANSAC-based scheme. This affine model can be used not only for motion compensation and detection, but also to estimate the homography matrix for the later "Plane+Parallax" representation in phase 2. The affine motion model $A_t^{t+1}$ globally compensates for the motion of pixels from $I_t$ to $I_{t+1}$. Those pixels that do not satisfy this affine motion model are classified 218 as residual pixels $\Phi_t$.

Before computing the geometric errors, the epipolar geometry is also estimated from the matched feature points in every two consecutive frames. The fundamental matrix $F_t^{t+1}$ is estimated by a RANSAC-based 8-point algorithm. The corresponding epipoles $e_t$ and $e_{t+1}$ are obtained as the null vector of the fundamental matrix.

Figure 3:
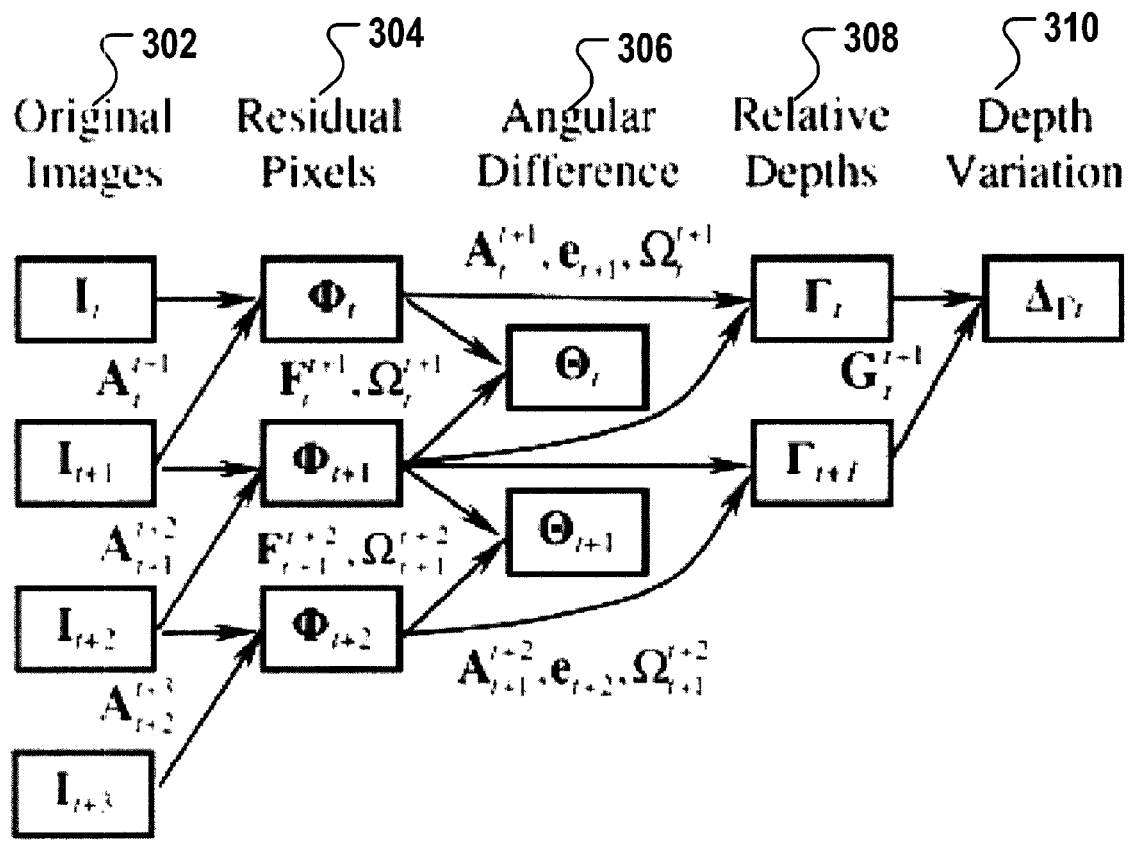
FIG. 3 is a block diagram illustrating the data processing components associated with phase 2 of the pipeline.

FIG. 3 is a block diagram illustrating the data processing components associated with phase 2 of the pipeline. Original images 302 are processed to identify the residual pixels 304. Angular difference map 306 is obtained from the residual pixels 304. In addition, relative depth maps 308 are obtained based on the residual pixels. Further, depth variation maps 310 are generated based at least on the relative depth maps.

Geometric constraint validation (i.e., computation of geometric constraint errors) is computed on the residual pixels in four consecutive frames. A set of dense point correspondences (optical flow) $\Omega_t^{t+1}$ is defined between two residual pixel maps $\Phi_t$ and $\Phi_{t+1}$, instead of the whole image, as follows:

$$\{P_t \rightarrow P_{t+1} : I(p_t) = I(p_{t+1}), p_t \in \Phi_t, p_{t+1} \Phi_{t+1}\}$$

where $I(p_t)$ is the image intensity of point $p_t$ in $I_t$. In addition, the optical flow can be estimated using various techniques including the intensity window matching techniques.

An angular difference map $\Theta_t$ is obtained by applying the epipolar constraints and point correspondences to the residual pixels. Epipolar constraint is used for motion detection between two views: If a pixel in view 1 does not lie on the epipolar line induced by its matched pixel in view 2, then the corresponding 3D point is determined to be moving. However, the epipolar constraint is not sufficient to detect all kinds of 3D motion. In particular, a special kind of 3D motion, called degenerate motion may not be accurately detected using epipolar constraint. The 3D point moves along the epipolar plane formed by the two camera centers and the point itself, whereas its 2D projections move along the epipolar lines. In this case, such a moving point cannot be detected by the epipolar constraint. The degenerate case often happens when the moving camera follows the objects moving in the same direction.

A relative depth map $\Gamma_t$ within the "Plane+Parallax" framework is generated by combining the epipole, optical flow, affine motion and residual pixels. Based on the structure consistency constraint, a bilinear relationship $G_t^{t+1}$ is derived to measure the errors between relative depth pairs and generate a depth variation map $\Delta_{\Gamma_t}$ between two relative depth maps. Therefore, various combinations of four consecutive frames $I_t, \ldots, I_{t+3}$ can be used to generate two angular difference maps and one depth variation map.

In order to suppress the estimation error in one single frame, a sliding window (typically 5 frames) can be implemented for parallax filtering. The angular difference maps and the depth variation maps are accumulated within the window and represented in likelihood functions. The filtering result is a likelihood map, instead of a binary mask image obtained by thresholding.

The JPDAF-based tracking framework infers the motion trajectory and bounding boxes of detected objects. It integrates multiple cues, such as the appearance and motion of detected blobs, and the geometric constraint errors, as observation nodes into a joint probability model. The joint probability is maximized by searching the optimal path across the nodes in a fixed-size buffer.

In calculating geometric constraint errors, two geometric constraints are implemented to reduce or eliminate the false detection of parallax regions. The disparity of residual pixels to the constraints is consequently defined.

Figure 4:
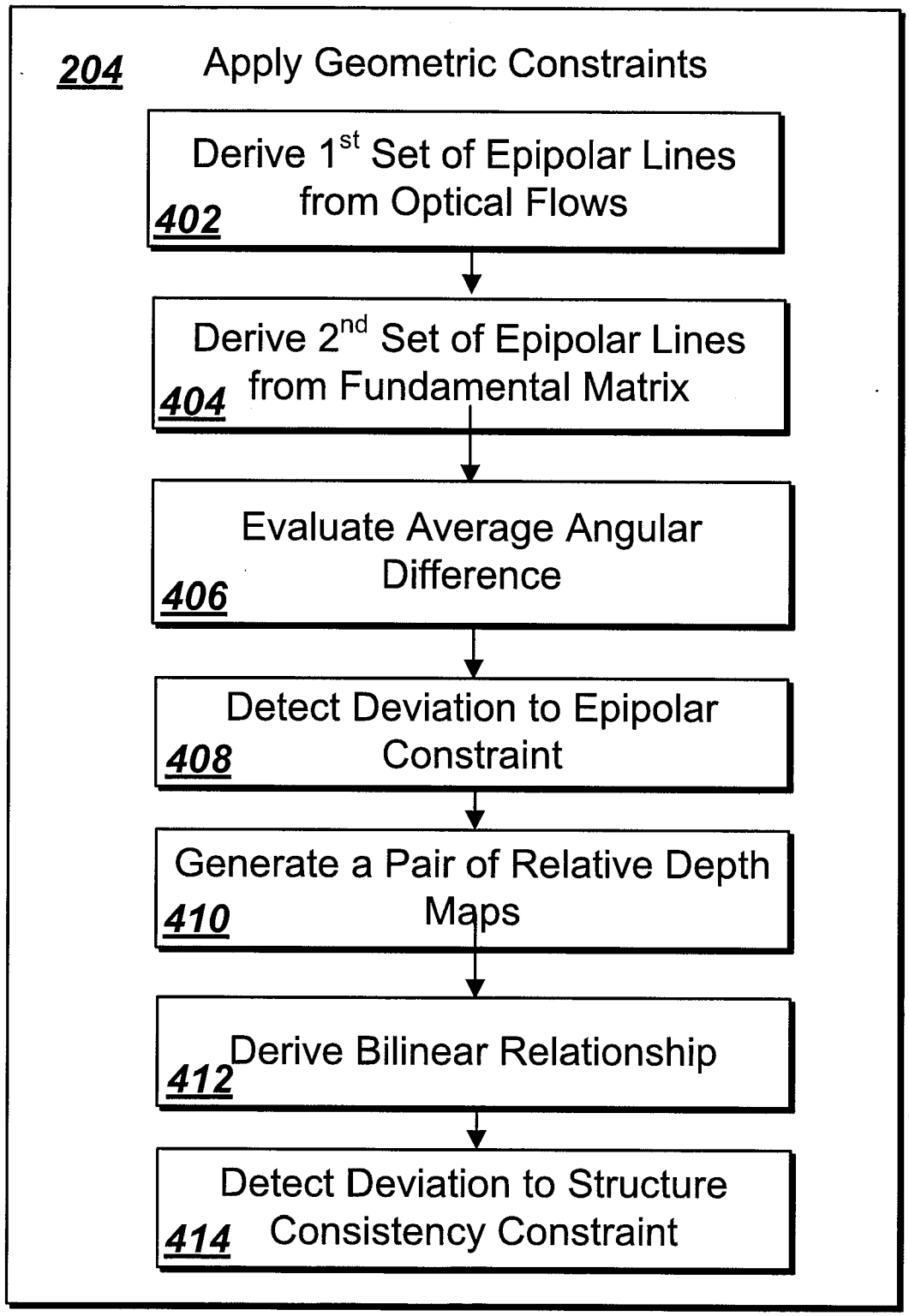
FIG. 4 is a process flow diagram of an example process 204 for implementing a first geometric constraint (the epipolar constraint errors) and a second geometric constraint (structure consistency constraints).

FIG. 4 is a process flow diagram of an example process 204 for implementing a first geometric constraint (the epipolar constraint errors) and a second geometric constraint (structure consistency constraints). In applying the first geometric constraint, two sets of epipolar lines are calculated. Let P denote a static 3D point in the scene and $p_t$ and $p_{t+1}$ as its projections in $I_t$ and $I_{t+1}$. Let $I_{t+1}$ denote a line connecting $e_{t+1}$, and $p_{t+1}$ in $I_{t+1}$ and similarly $I_t$ connecting $e_t$ and $p_t$ in $I_t$. These two epipolar lines (first set) are derived 402 from the optical flows (image apparent motion) according to Equation (1).

$$I_{t+1}=e_{t+1} \times p_{t+1}, I_t=e_t \times p_t \quad (1)$$

Alternatively, two epipolar lines $I'_{t+1}$ and $I'_t$ (second set) can be obtained 404 by using the fundamental matrix according to Equation (2).

$$I'_{t+1}=F_t^{t+1} p_t, I'_t=(F_t^{t+1})^T p_{t+1} \quad (2)$$

Figure 5:
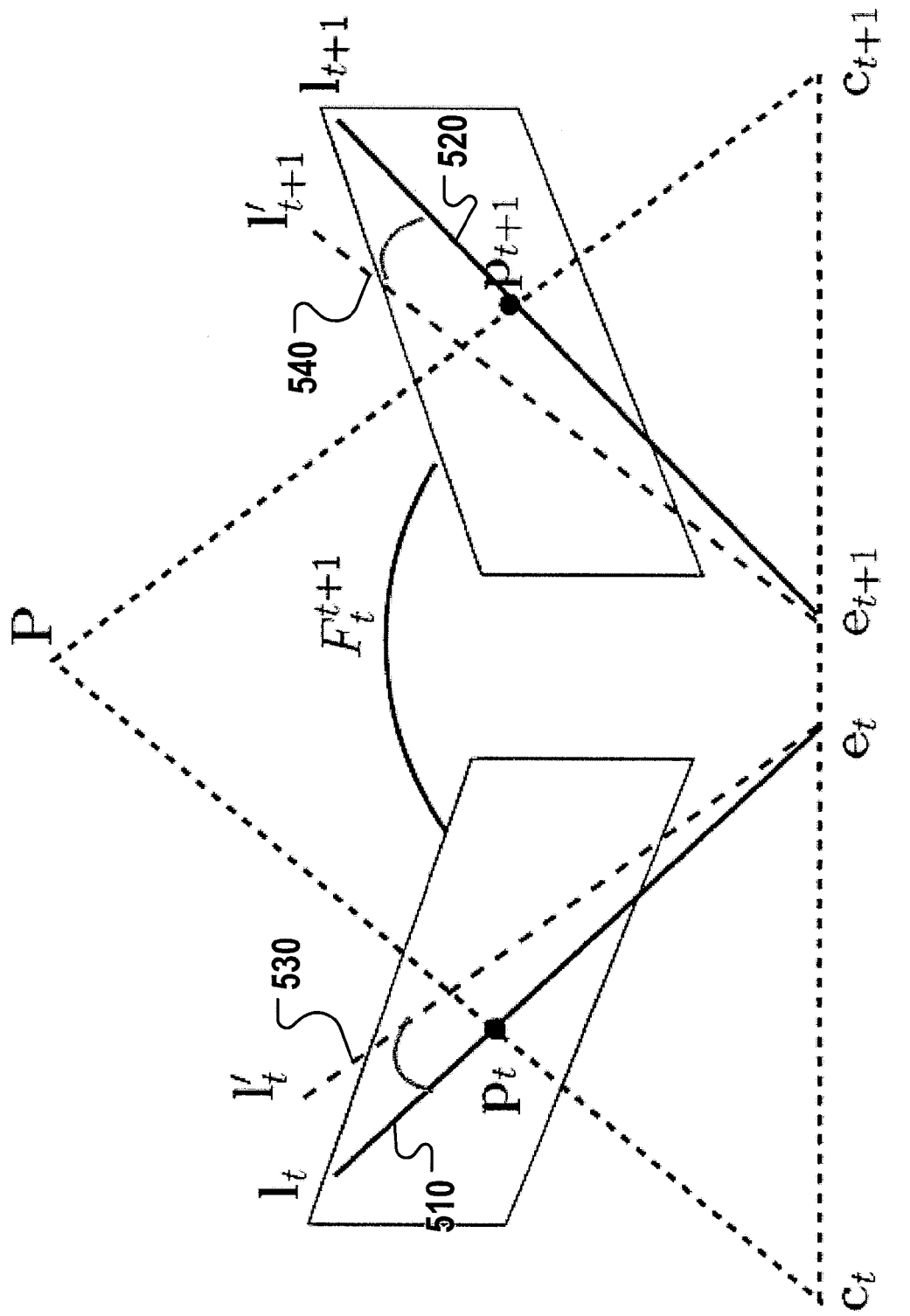
FIG. 5 is a diagram showing a discrepancy between the lines 510, 520 derived from point correspondence and lines 530, 540 derived from fundamental matrix.

Because static points lie on the epipolar plane, the static points satisfy both optical flow constraints and epipolar constraints, so that $I_t \cong I'_t$ and $I_{t+1} \cong I'_{t+1}$ ($\cong$ means equal up to a scale factor). However, the points that lie on an moving object do not satisfy this epipolar constraint. FIG. 5 is a diagram showing a discrepancy between the lines 510, 520 derived from point correspondence and lines 530, 540 derived from fundamental matrix.

Referring back to FIG. 4, moving pixels belonging to independently moving objects in a scene can be identified by evaluating 406 the average angular difference between epipolar lines according to Equation (3), $$\theta'_t=[\angle(I_t, I'_t)+\phi(I_{t+1}, I'_{t+1})]/2 \quad (3)$$

where $\angle$ denotes the angle between two 2D lines. Due to the presence of estimation errors of epipolar geometry and image noise, the angular differences for static points are generally not zero. The deviation of the residual pixels to the epipolar constraint (size of the angular difference) is detected 408. Pixels are identified as tending to belong to independently moving objects in a scene when detected a large angular difference.

Figure 6:
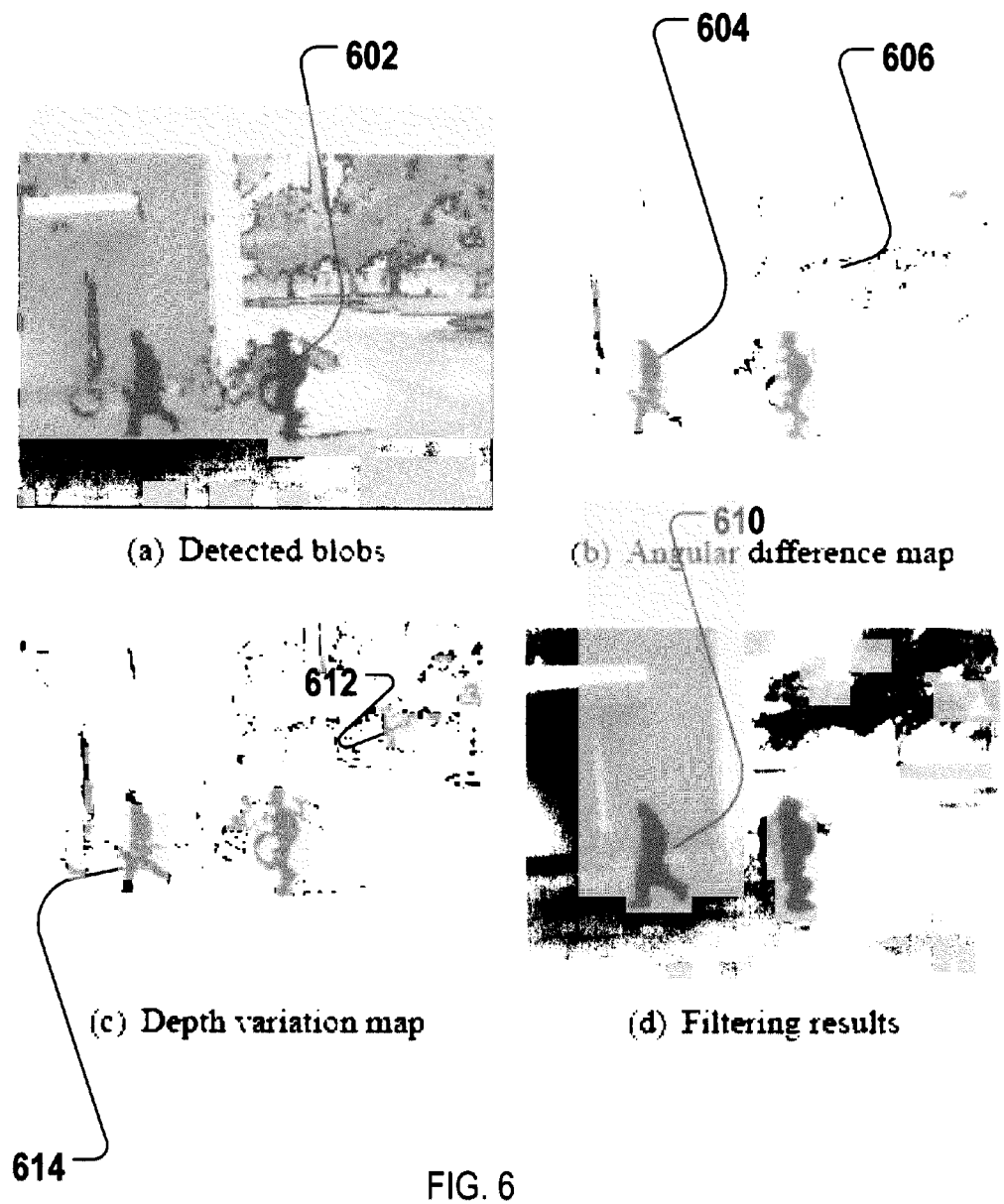
FIG. 6(a), both independently moving objects (602) and the parallax from the stationary structures are detected as moving regions.
In FIG. 6(b), a higher angular difference for moving humans (604) is observed. In contrast, the angular difference for trees and building edges (606) is lower.
FIG. 6(c) illustrate the variation of depth maps corresponding to the image as shown in FIG. 6(a).
FIG. 6(d) shows thresholding the likelihood map for removing parallax pixels.

In FIG. 6(a), both independently moving objects (602) and the parallax from the stationary structures are detected as moving regions. In FIG. 6(b), a higher angular difference for moving humans (604) is observed. In contrast, the angular difference for trees and building edges (606) is lower.

However, this angular difference derived from the discrepancy between point correspondence and epipolar constraint may not be sufficient to accurately identify the pixels that belong with independently moving objects. In some cases, the independently moving objects may be moving along the epipolar line or more generally in the epipolar plane. In these cases, the proposed angular difference may not be able to distinguish between parallax regions and independently motion regions. In order to resolve this ambiguity, a second geometric constraint is implemented.

The structure consistency constraint (second geometric constant) is implemented within the "Plane+Parallax" representation which provides a dense estimation of scene structure relative to a reference plane. Given a 2D homography between two frames and the epipoles, the relative depth of a pair of matched points can be estimated according to Equation (4):

$$\gamma_t^i = \frac{(A_t^{t+1} p_t^i \times p_{t+1}^i)^T (p_t^i \times e_{t+1})}{\|p_t^i \times e_{t+1}\|^2} \quad (4)$$

where $p_t^i$, $P_{t+1}^i$ are the $i^{th}$ matched point pairs between frame $I_t$ and $I_{t+1}$, $\gamma_t^i$ is the estimated relative depth for $p_t^i$, $A_t^{t+1}$ is the 2D affine motion model (homography), and $e_t$, $e_{t+1}$ are the epipoles. Homography is used as a global motion model to compensate for the camera motion between consecutive video frames. Pixels consistent with the homography are classified as belonging to the static planar part of the scene. Those inconsistent ones, called residual pixels, may correspond to moving objects (motion regions) or to static 3D structure with large depth variance (parallax pixels). Additional geometric constraints are then needed to separate the parallax pixels from the motion regions.

A dense relative depth map $\Gamma_t\{(p_t^i, \gamma_t^i)\}$ is therefore constructed 410 for the residual pixels in $I_t$, i.e. the map $\Phi t$. One single depth map does not provide enough cues for classifying a pixel into parallax or independent motion, as the depth of points belonging to either part is generally nonzero. However, this classification is possible between at least two relative maps. Based on the assumption that the scene structure (parallax regions) remains constant in the Euclidean world coordinate, a bilinear relationship is derived 412 to relate a pair of relative depth maps. A determination is made 414 on whether a pixel conforms to the bilinear relationship. When detected that a pixel does not conform 416 to this relationship (detected disparity), the pixel is classified as independent motion. Alternatively, the residual pixels that conform 418 to this relationship are classified as parallax.

The bilinear relationship is derived below. Given a static 3D point in the world coordinate, its camera coordinates in $I_t$ and $I_{t+1}$ are respectively denoted by $P(x, y, z)^T$ and $P'(x', y', z')^T$. Their 2D projections are respectively $p(u, v, 1)^T$ and $p'(u', v', 1)^T$. Integrating the camera motion model $P'=RP+t$ and the perspective projection model p=MP/z and p'=M'P'/z', the relationship between the 2D projections is described as follows, $$z'M'^{-1}p' = zRM^{-1}p + t \quad (5)$$

where R and t are the camera rotation and translation, M and M' are the camera internal parameter matrices. This is the mathematical representation of structure consistency.

The geometric definition of the relative depth is a ratio of point depth over the distance of the point to the reference plane as follows $$\gamma = \alpha \frac{H}{z} = \alpha \frac{n^T P - d}{z} = d\alpha \frac{v^T P - 1}{z} \quad (6)$$

where H is the distance of point P to the reference plane Π, also called "height". The normal vector of Π is n and d is the height of the original point. The scaled normal vector is v=n/d. α is a constant for each frame and after normalizing the depth map, dα could be set to be 1. Thus the relative depth for p and p' are simplified as, $$\gamma = \frac{v^T P - 1}{z}, \quad \gamma' = \frac{v'^T P' - 1}{z'} \quad (7)$$

where v' is the scaled normal vector for Π' in $I_{t+1}$.

Let the third row of R be denoted by $r_3$ and the third component of t is $t_3$, the depth z' of point P' could be derived from (5) as below, $$z' = z(r_3 M^{-1} p) + t_3 \quad (8)$$

z and z' can be represented alternatively from (7), $$z^{-1} = v^T M^{-1} p - \gamma, \quad z'^{-1} = v'^T M'^{-1} p' - \gamma' \quad (9)$$

By substituting (9) into (8), the following is produced:

$$v^T M^{-1} p - \gamma = (v'^T M'^{-1} p' - \gamma')[(r_3 + t_3 v^T) M^{-1} p - t_3 \gamma] \quad (10)$$

Derive each side of (10), $$LHS = \begin{bmatrix} P' \\ \lambda' \end{bmatrix} \begin{bmatrix} 0 \\ 0 \\ 1 \\ 0 \end{bmatrix} [v^T M^{-1} \ -1] \begin{bmatrix} P \\ \gamma \end{bmatrix} = \begin{bmatrix} P' \\ \gamma' \end{bmatrix}^T G_1 \begin{bmatrix} P \\ \gamma \end{bmatrix}$$

$$RHS = \begin{bmatrix} P' \\ \lambda' \end{bmatrix}^T \begin{bmatrix} M'^{-1} v' \\ -1 \end{bmatrix} [(r_3 + t_3 v^T M^{-1}) \ -t_3] \begin{bmatrix} P \\ \gamma \end{bmatrix} = \begin{bmatrix} P' \\ \gamma' \end{bmatrix}^T G_1 \begin{bmatrix} P \\ \gamma \end{bmatrix}$$

Finally, the following is produced $$[p'^T \gamma'] G_{4 \times 4} \begin{bmatrix} P \\ \gamma \end{bmatrix} = 0$$

where $G = G_1 - G_2$. Since rank($G_1$)=rank($G_2$)=1, G is generally a rank-2 matrix. This matrix is solved by robustly fitting it to at least 15 relative depth pairs selected by a RANSAC scheme and subsequently imposing rank-2 constraint onto potential solutions.

This $G_{4\times 4}$ matrix is a bilinear constraint which absorbs the plane normal vectors (n, n'), camera internal matrices (M, M'), the third row of camera rotation ($r_3$) and the third component of camera translation ($t_3$). It directly relates the 2D point measurements (p, p') and their relative depth (γ, γ') without knowing the camera configuration and plane position, and furthermore the reference planes are not required to be the same. If v=v', then G can be also applied.

G relates the relative depth map $\Gamma_t$ derived from $I_t$, $I_{t+1}$ and $\Gamma_s$ derived from $I_s$, $I_{s+1}$ as long as the two depth maps share the same scene structure. If s=t+1, G is related to the trifocal tensor which relates the matching points within three frames, $I_t$, $I_{t+1}$ and $I_{t+2}$. In this sense, G can be treated as the combination of trilinear constraint and plane homographies.

The variation between depth maps is defined as the absolute algebraic error with respect to G, $$\delta_G(p, \gamma, p', \gamma') = \left| [p'^T \ \gamma'] G_{4 \times 4} \begin{bmatrix} P \\ \lambda \end{bmatrix} \right| \quad (11)$$

A depth variation map $\Delta_\Gamma$ is then obtained by computing variation for each residual pixel.

FIG. 6(c) illustrates the variation of depth maps corresponding to the image as shown in FIG. 6(a) and the independently moving objects 614 and the parallax from the stationary structures 612.

The detected disparity can be used to relate the residual pixels to the two geometric constraints, namely the epipolar constraint and structure consistency constraint. The detected disparity can be used to filter out the parallax regions (pixels) from the initial detection results. Unlike other parallax filtering methods that directly threshold the disparity, the disparity values are represented in probabilistic terms, namely likelihood functions. Then the filtering result can be formulated as a likelihood map instead of a binary mask image.

The likelihood models of a pixel to belong to an independently moving object based on the geometric constraints are defined as follows:

$$L_\theta(P_t^i) = \begin{cases} 1 - \exp(1 - \alpha_\theta \theta_t^i) & \text{if } \theta_t^i \leq \tau_\theta, \\ 1 & \text{if } \theta_t^i > \tau_\theta \end{cases} \quad (12)$$

$$L_\delta(P_t^i) = \begin{cases} 1 - \exp(1 - \alpha_\delta \delta_t^i) & \text{if } \delta_t^i \leq \tau_\delta, \\ 1 & \text{if } \delta_t^i > \tau_\delta \end{cases} \quad (13)$$

where $L_\theta$ and $L_\delta$ are respectively the likelihood function based on angular difference $\theta_t^i$ and depth variation $\delta_t^i$. $\alpha_\theta$ and $\alpha_\delta$ are positive weight factors. $\tau_\theta$ is a cut-off threshold (typically 10°) for angular difference. $\alpha_\delta$ is a cut-off threshold for depth variation learned from practical data.

In addition, the geometric constraint errors can be accumulated within a sliding window (typically 5 frames) defined around a reference frame. The constraint errors estimated in current window also can be utilized in overlapped windows to reduce the computational load.

The accumulated likelihood of point $p_{t_0}^i$ in the reference frame $I_{t_0}$ to belong to an independently moving object is defined as:

$$P_{Ind}(p_{t_0}^i) = \sum_{t=t_0-w}^{t_0+w} e^{-\lambda(t-t_0)} [\eta L_\theta(p_t^i) + (1-\eta) L_\delta(p_t^i)] \quad (14)$$

where the corresponding pixels $p_t^i$ in other frames $I_t$ ($t \neq t_0$) are obtained by the optical flow mapping $\Omega_{t_0}^t$. w is the half size of the window. λ is a positive weight factor and $\exp(-\lambda(t-t_0))$ enforces a large influence on the frames closer $t_0$. η balances the influence of each likelihood model.

To characterizing these moving regions or blobs in the image sequence, this pixel-based information can be integrated to its adjacent moving pixels using 8-connectivity, for example. The likelihood of each detected moving blob B is obtained by integrating the likelihood of all the pixels within this region as follows, $$P_{Ind}(B_{to}^j) = 1 - \exp\left(-\frac{1}{|B_{tot}^j|} \sum_{p_{to}^i \in B} P_{Ind}(p_{to}^i)\right) \quad (15)$$

Thresholding the likelihood map is a straightforward method for removing most of parallax pixels and can achieve good results for moving object (610) for specific videos as shown in FIG. 6(d). However, thresholding is inherently not flexible since the threshold value needs to be adjusted for each different sequence. Therefore, the likelihood maps can be directly integrated into the tracking algorithm instead of the binary (0-1) mask images obtained by thresholding the likelihood maps.

Tracking a moving object can be accomplished by using a Spatial-temporal JPDAF-based approach. Using the JPDAF-approach, the tracking problem can be characterizing as identifying the position of the moving object that maximizes appearance and motion models. The optimal position at each time step can depend on the current appearance observations, as well as the motion estimation obtained at the previous optimal positions. The classical JPDAF-based tracking approach can be limited to local optimal solution since the decision made at time t is based only on current measurement and previous solution at time t−1. If a wrong estimation of the position is selected at time t, due to occlusions or to a bad detection, the tracking may not be able to recover the right solution at a later time.

To extract the optimal path, discriminating evidence from past observations is observations is collected in a buffer. However, if the detected moving regions are due to parallax, this parallax information is propagated through tracking step, and it interferes with the extraction of accurate trajectories of the moving objects. Thus, the above described process is incorporated into the tracking algorithm for detecting moving blobs using the likelihood of a moving pixel to belong to a moving object in the scene or to parallax.

The JPDAF-based process enables identification of the optimal position of the moving object at each time step. The optimal position can depend on several cues such as the current appearance observation, the motion estimation and the blob's probability to belong to a moving object or parallax. Each cue is associated with a probability measure. A joint probability is defined to reflect current and past observations and define the appropriate data association (i.e. tracking) by maximizing this joint probability by collecting discriminating evidences in the sliding buffer.

The joint probability of a given position and bounding box at time t is given by:

$$P(A^t, X^t, B^t, \ldots, A^0, \hat{X}^0, \hat{B}^0) = P(A^t | X^t)P(X^t | \hat{X}^{t-1}, \ldots, \hat{X}^0) \cdot \quad (16)$$
$$P(B^t | X^t, \hat{X}^{t-1})P_{total}(\hat{X}^{t-1}, \hat{B}^{t-1})$$
$$= P_{app}(A^t)P_{motion}(X^t)P_{Ind}(B^t)$$
$$P_{total}(\hat{X}^{t-1}, \hat{B}^{t-1})$$

where $A^t$ denotes the appearance of the moving object, $X^t$ and $\hat{X}^t$ respectively denote the current and optimal positions of the moving object, and $B^t$ and $\hat{B}^t$ denote respectively the current and optimal bounding boxes of the moving objects. The selection of the optimal path is guided by the following equation:

$$(\hat{\xi}, \hat{\psi}) = \quad (17)$$
$$\operatorname{argmax}\left(\mu \log P_{total}(\hat{X}^t, \hat{B}^t), (1-\mu)\sum_{\xi,\psi} \log[\tilde{P}_{app}(\xi)\tilde{P}_{motion}(\xi)\tilde{P}_{Ind}(\psi)]\right)$$

where $0<\mu<1$ is a weight factor used for increasing the confidence level of the refined path, $\hat{\xi}$ is the refined optimal path, $\xi$ is the selected possible sub-optimal path, $\hat{\psi}$ is the refined set of bounding boxes, $\psi$ is the selected possible sub-optimal bounding boxes, $\tilde{P}_{app}(\xi)$ and $\tilde{P}_{motion}(\xi)$ correspond respectively to the appearance, and motion probability along the path $\hat{\xi}$, and $\tilde{P}_{Ind}(\psi)$ corresponds to the independence probability within the bounding box $\psi$.

The techniques described in this specification enables detection and tracking of moving particles from real video sequences. FIGS. 6(a), 6(b), 6(c), 6(d), 7(a), 7(b), 7(c), 8(a), 8(b) and 8(c) represent summary of results obtained from three video sequences that include one video shot by ground-based cameras and two by airborne cameras. In FIGS. 7(a), 7(b) and 7(c) show a sequence of frames containing very strong parallax due to the large proximity of the camera to large structures in the scene. An initial detection result is presented in FIG. 7(a), filtered detection result is presented in FIG. 7(b), and the tracking results after removing parallax is presented in FIG. 7(c). The parallax regions in the video, i.e. the building facade and static vehicles, are successfully removed.

FIGS. 8(a), 8(b) and 8(c) show sequence of frames containing a large amount of parallax caused by an UAV flying at very low altitude. In FIG. 8(a), an initial detection result is presented, where the signs and marker lines on the road are incorrectly detected as motion. The filtered detection result is presented in FIG. 8(b), and the tracking result after removing parallax is presented in FIG. 8(c). The detection and tracking technique as described in this specification successfully filters regions due to parallax in both examples. Particularly, in FIG. 8(c), many of small objects, which are near the epipole, are also successfully tracked although the variation of the depth maps is not significant around the epipoles by measuring the amplitude of the depth maps. Note that in this video, the camera is moving forward while the vehicles are also moving forward along the road. The epipolar constraint is not applicable in this situation and yet the structure consistency constraint still works.

Subject matter described in this specification can be implemented to detect and track independent moving regions in presence of strong parallax. An affine motion compensation and detection framework generates the initial detected blobs which correspond to either parallax regions or independent motion. The subject matter described in this specification filters out the parallax regions by analyzing two geometric constraints. The first constraint is the epipolar constraint represented by the angular difference between epipolar lines. The second constraint is the structure consistency constraint implemented as the variation between relative depth maps within "Plane+Parallax" framework. The variation of relative depth is obtained by a newly derived bilinear relationship. The disparity to the geometric constraints are represented in likelihood models and accumulated within a number of frames during parallax filtering. The accumulated likelihood maps are then integrated into the tracking framework. The use of a spatiotemporal JPDAF allows us to track moving objects in cases where the tracking provided by classical JPDAF was not optimal due to the lack of discriminating evidences. The defined JPDAF maximizes the joint probability by searching the optimal path across the nodes within a chosen buffer.

In some implementations, the subject matter described in this specification can be implemented to fully employ 3D information (e.g. 3D motion trajectory). Integrating 3D information may improve tracking performance In some implementations the motion detection in multiple views can be implemented. In this specification, the term, "point" is used synonymously with the term "3D point", whereas "pixel" refers to the point's 2D image or projection. Suppose that a static point $P(x, y, z)^{T\psi}$ in the world coordinate is viewed by a moving camera at different time instants, $i\psi=1, 2, 3 \ldots$. Let $P_i(x_1, y_1, z_1)^{T\psi}$ denote its 3D camera coordinates at time i. Let the camera pose relative to the world coordinate be denoted by a 3×3 rotation matrix $R_{i\psi}$ and a 3×1 translation vector Ti. Then, the transformation from the world coordinate to the camera coordinate is $$P_{i\psi}=R_iP+T_i\cdot\psi \quad (18)$$

For simplicity, an assumption is made that the coordinate system of camera 1 is also the world coordinate; that is, $R_1=I$ and $T_1=0$. Let $P_i(u_1, v_1, 1)^{T\psi}$ denote the 2D image of P in view $i\psi$ by a perspective projection model:

$$P_{i\psi}=K_iP_i/z_{i\psi} \quad (19)$$

and, alternatively, by $$z_iP_{i\psi}=K_iP_i\cdot\psi \quad (20)$$

where $K_{i\psi}$ holds the camera-intrinsic parameters for view i. If the point P is moving, then let $P'=+\Delta P$ denote its new position in the world coordinate at time 2 and $p'_2$ as its projection in view 2. Based on (18) and (20), $p_2$ and $p'_2$ can be related as follows:

$$z''_2 p''_2 = z_2 p_2 + K_2 R_2 \Delta P \cdot \psi \quad (21)$$

Similarly, let $P'''=P'+\Delta P'^{\leftarrow}$ denote the new point position in the world coordinate at time 3 and $p''_3$ as its projection in view 3. The following results $$z''_3 p''_3 = z_3 p_3 + K_3 R_3 (\Delta P + \Delta P') \cdot \psi \quad (22)$$

In other words, the matched 2D pixels in multiple views may be the projections of a moving 3D point, that is, $(p_1, p''_2, p''_3)$ instead of $(p_1, p_2, p_3)$. The motion detection problem in two or three views from a moving camera is then formulated as validating whether the matched pixels $(p_1, p_2, p_3)$ or $(p_1, p'_2, p''_3)^{\leftarrow}$ correspond to the same static 3D point P or, equivalently, $\Delta P=0$ or $\Delta P=0$.

The epipolar constraint is a geometric constraint for motion detection in two views, which encapsulates the relative orientation between two cameras. In the un-calibrated cases, The epipolar constraint is represented by the fundamental matrix $F_{21}{}^1$ that relates the 2D images of the same 3D point as follows $$p_2{}^{T\psi}F_{21}p_1=0\cdot\psi \quad (23)$$

Let $l_2=F_{21}p_1$
denote an epipolar line in view 2 induced by $p_1$. If the point is static, then $p'_2$ should ideally lie on $l_2$. Similarly, $p_1$ should ideally lie on the epipolar line $l_2=F_{21}p_1$.

A pixel-to-line distance $d_{epi\psi}$ is defined to measure how much the pixel pair deviates from the epipolar lines:

$$d_{epi\psi}=(|l'_1\cdot p_1|+|l_2\cdot p'_2|)2\cdot\psi \quad (24)$$

where $|l'_1\cdot p_1|$ and $|l_2\cdot p'_2|$ are the perpendicular distances from $p_1$ to $l'_1$ and from $p'_2$ to $l_2$, respectively. Each line vector $l(l_u, l_v, l_w)^{T\psi} \leftharpoonup$ is normalized such that $l(l_u, l_v, l_w)^{T\psi} \leftharpoonup$.

$d_{epi\psi}$ is used to detect whether the point P is moving or not. Ideally, when detected that $d_{epi\psi}>\psi 0$, then the pixels deviate from the epipolar lines and, therefore, $P_\psi$ is moving, as shown in FIG. 9A.

Figure 9A:
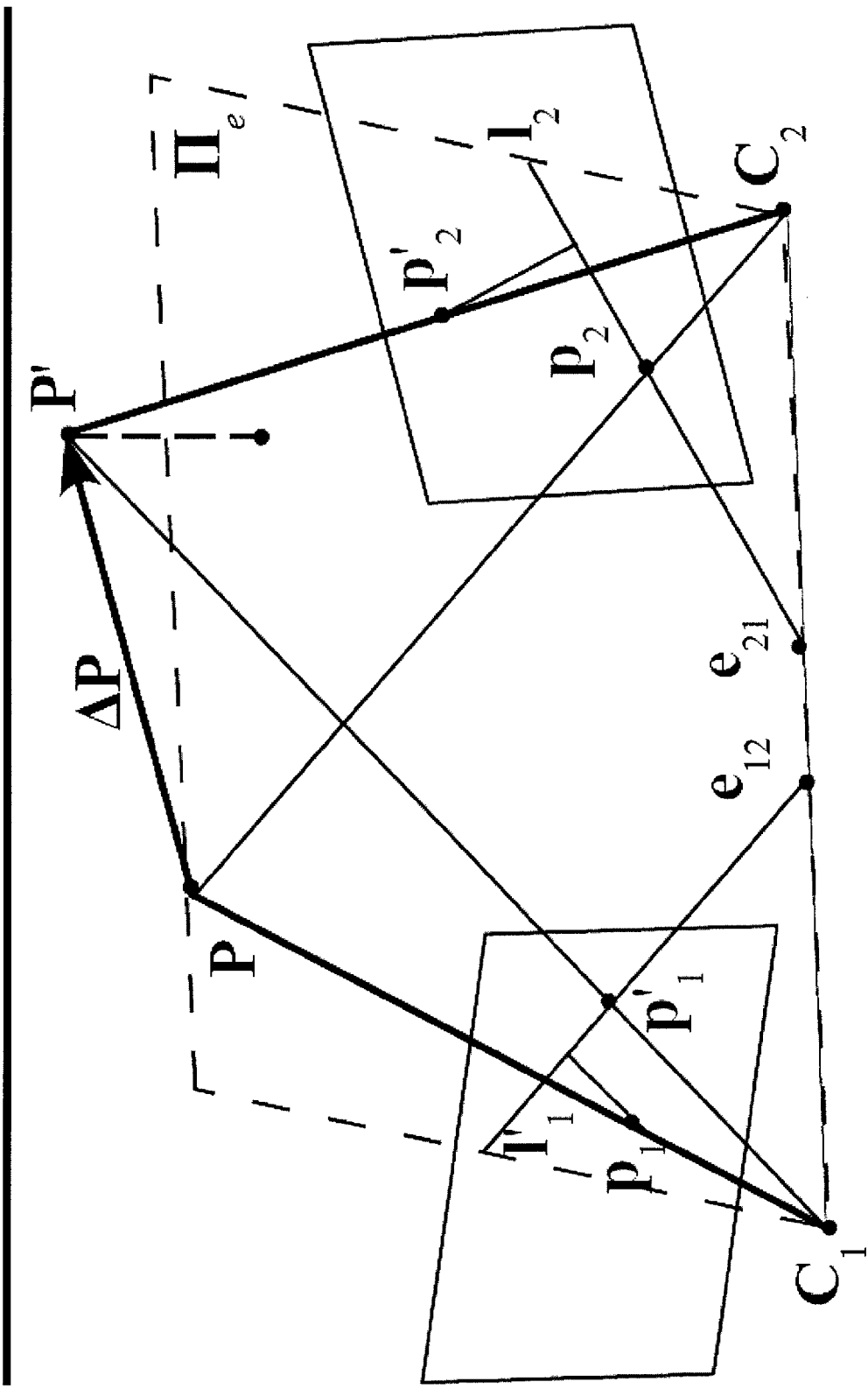
FIGS. 9A and 9B illustrate applying the epipolar constraint to motion detection.
Figure 9B:
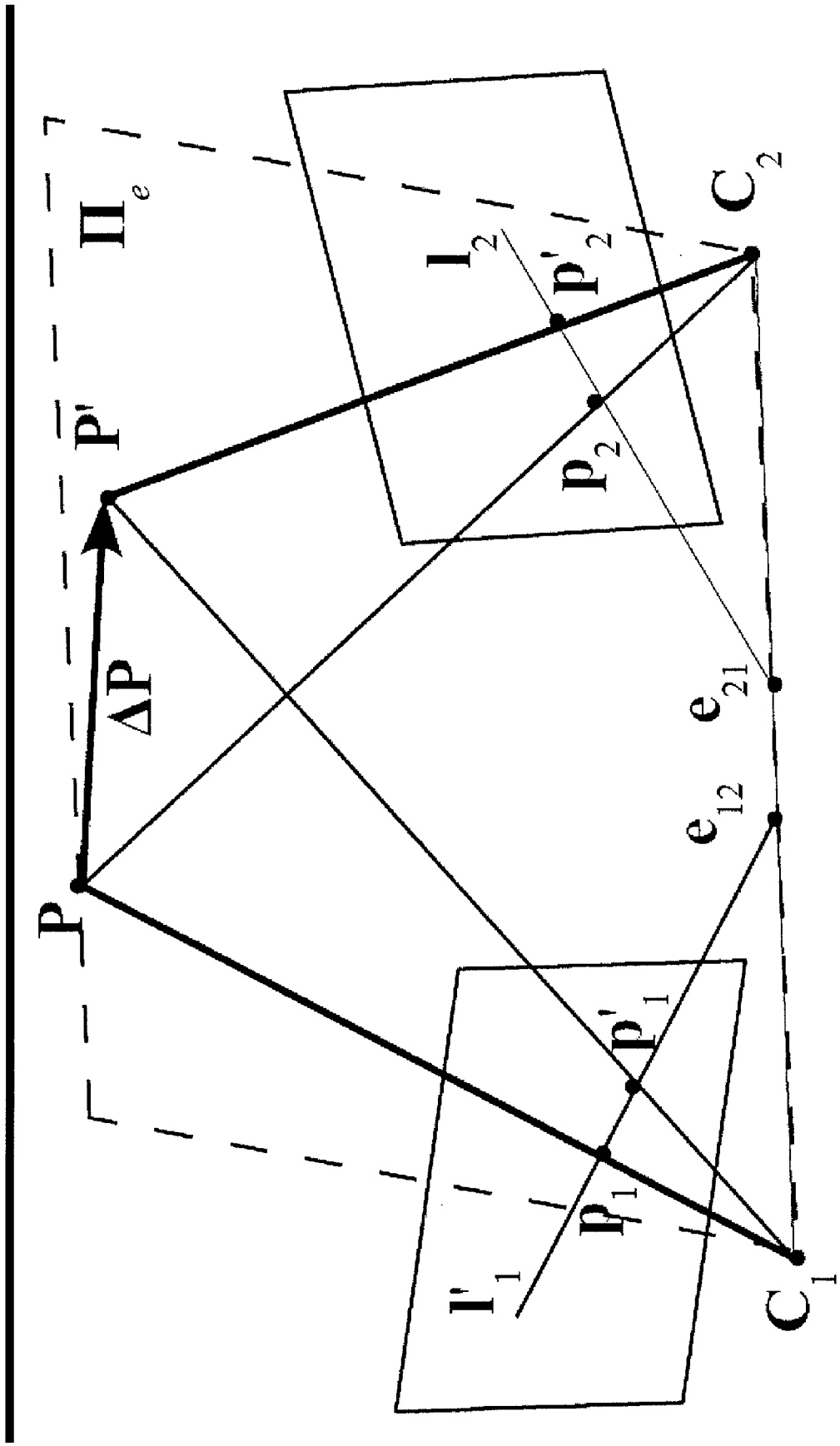

FIGS. 9A and 9B illustrate applying the epipolar constraint to motion detection. The two images are taken by a moving camera at times 1 and 2, with $C_1$ and $C_2$ being the 3D camera centers and $e_{12}$ and $e_{21}$ being the 2D epipoles. P is the position of a 3D point at time 1 and moves to P' at time 2. P is projected into two images as $p_1$ and $p_2$, whereas P' corresponds to $p'_1$ and $p'_2$. $\Pi_{e\psi}$ is the 3D epipolar plane determined by $C_1$, $C_2$, and P. (a) Moving pixels deviate from epipolar lines. (b) Degenerate case: Pixels move along epipolar lines.

In some implementations, moving objects may not be detected using epipolar constraint. For example, for a given degenerate configuration, moving points cannot be detected by the epipolar constraint. A degenerate configuration happens when the camera follows the objects moving in the same direction, as illustrated in FIG. 9B. In the 3D Euclidean space, the point P moves to P', which remains in the epipolar plane established by the camera centers $C_1$, $C_2$, and P itself. In 2D images, the pixel P'2 moves along $l_2$. In this situation, the point is moving and, yet, $d_{epi\psi}=0$.

Therefore, the epipolar constraint is not sufficient to determine whether a point is static or moving in two views. When detected that the pixels are moving along the epipolar lines, then the motion cannot be detected by the epipolar constraint. Such degeneracy can be remedied using multi-view constraints. For example, the trilinear constraint can be utilized to detect moving points across three views. However, estimating the trifocal tensor is not a trivial task, and it requires accurate feature matches and short camera baselines.

Let $\Pi$ denote a so-called reference plane in the 3D space. The in-plane points satisfy the plane equation as $N\cdot P=d$, where $N(N_x, N_y, N_z)^{T\psi} \leftharpoonup$ is the normal vector of $\Pi$, and d is the distance of the origin from $\Pi$. The distance of point P from $\Pi$ is defined as its "height" $H\psi$ such that $H\psi = N\cdot P - d$. A projective depth of point P is then defined as the ratio of the point's height to the point's depth:

$$\gamma\psi = H/z\cdot\psi \quad (25)$$

If $P \in \Pi$, then $\gamma\psi=0$. Inversely, if $\gamma\psi=0$, then $P \notin \Pi$.

Given a static off-plane point $P_0$ with its projective depth $\gamma_0$, the relative affine structure of P is defined as $$k\psi = \frac{\gamma}{\gamma_o} = \frac{z_o\cdot H\psi}{H_o\cdot z}\cdot\psi \quad (26)$$

Since $\gamma_0$, is constant for each pair of views, k is viewed as a projective depth up to a scale factor hereafter. Let $\Pi_{12}$ denote a reference plane in the scene, which is selected between views 1 and 2. It induces a homography transformation between the two views, $H_{12}$, such that the images of any in-plane point satisfy $P_1 \sim p_{1\omega\psi}=H_{12}p_2$. Otherwise, the 2D image of a static off-plane point is decomposed into the warped position (planar part) plus the parallax vector as follows:

$$p_1 \sim H_{12}p_2 + k_{12}e_{12}\cdot\psi \quad (27)$$

where the epipole $e_{12}$ is the projection of the camera center in view 2 into view 1.

As shown in (27), $p_1$, $p_{1w}$, and $e_{12}$ are collinear. By performing a cross-product of $p_1$ over both sides of (27) followed by a vector normalization, the projective depth $k_{12}$ is determined as follows:

$$\kappa_{12} = \frac{(H_{22}p_2 \times p_2) \overset{T\psi}{\leftarrow} (p_2 \times e_{22})}{\|p_2 \times e_{22}\| \overset{2}{\leftarrow}}, \psi \tag{28}$$

where the scale of $H_{12}$ determines the global scale of $k_{12}$. The "Plane+Parallax" representation is indeed a projective reconstruction of the scene. Let $\tilde{P}_{12} = \leftarrow(p_1; k_{12}) = [u_1 v_1 1 \cdot k_{12}]\overset{T\psi}{\leftarrow}$ denote the projective structure of the 3D point P. If the camera parameters and plane positions are known, then $\tilde{P}$ can be converted to its Euclidean counterpart P.

Assume that the reference plane across multiple views remains constant and, therefore, the distances of the points to the reference plane remain unchanged. In practice, however, this assumption is not always valid.

Figure 10:
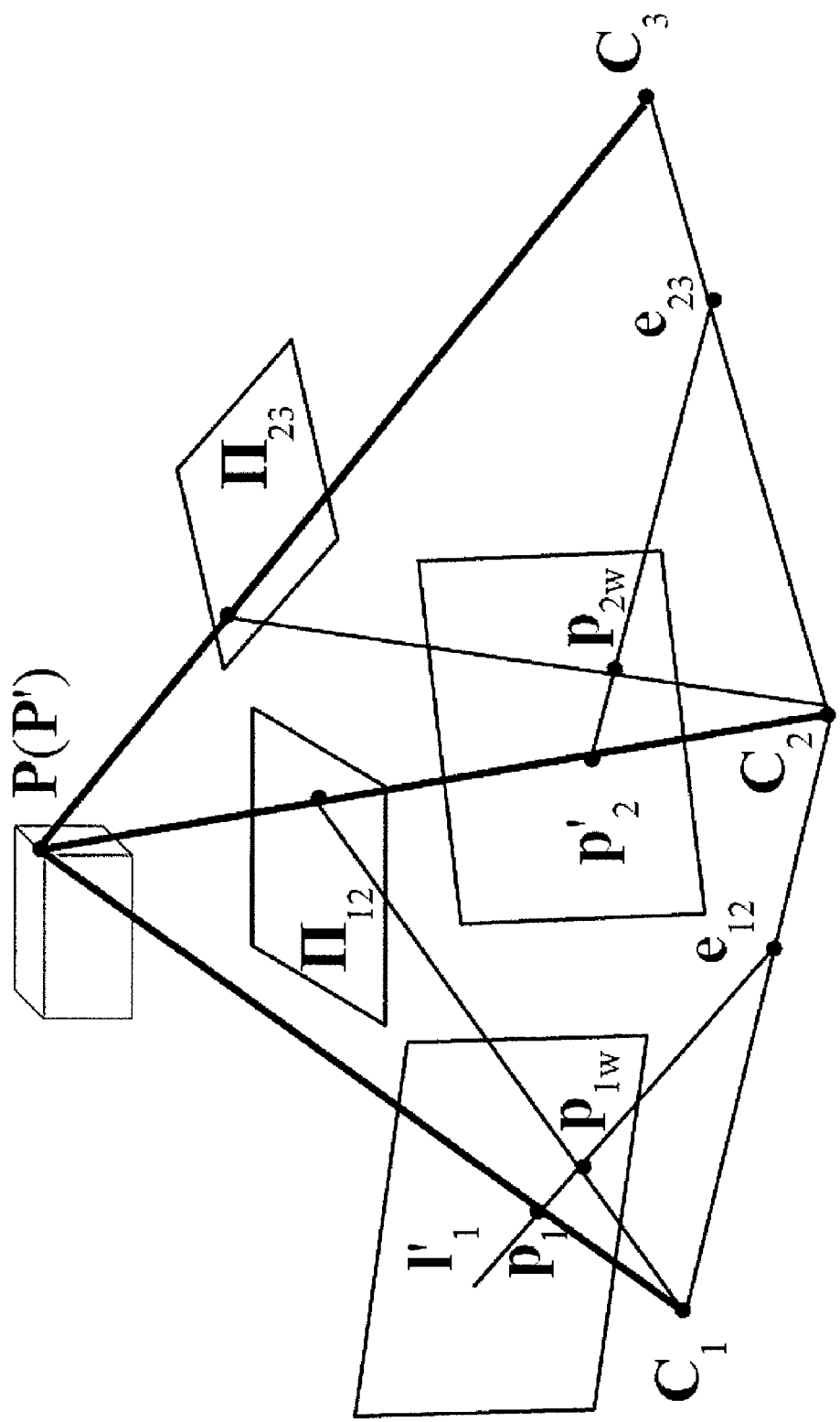
FIG. 10 shows that the "Plane+Parallax" decomposition is obtained between two reference planes.

Given a set of matching features between two views, a 2D homography is automatically computed by robust schemes. The reference plane defined by the homography may correspond to different parts of the scene. For example, the reference plane might correspond to the ground plane in views (1, 2) and a building facade in views (2, 3). Therefore, the previous constraints may not be suitable for application. In order to solve this problem, a novel three-view constraint that works with varying reference planes. Assume that the "Plane+Parallax" decomposition is obtained between views (1, 2) and views (2, 3), as shown in FIG. 10. The homography $H_{12}$ induces the projective structure of a static point $\tilde{P} = (p_2, k_{12})$ from views 1 and 2. From $\tilde{P}_{12}$ itself, it is hard to tell if the point is moving or not. However, if another projective structure $\tilde{P}_{23} = (p_2, k_{23})$ from views 2 and 3 is obtained, then there exists a relationship between the pair of projective structures. As derived in the, a bilinear relationship exists between the pair of projective structures corresponding to the same static point as follows:

$$\tilde{P}_{23}^{T\psi} G \tilde{P}_{12} = 0\psi \tag{29}$$

where G is a 4_4 matrix.

The G matrix represents a bilinear constraint for 3D projective structures of the same point, similar to the 2D case of the fundamental matrix. Intuitively, $G\tilde{P}_{12}$ creates a 3D plane in which $\tilde{P}_{23}$ should lie. However, such a plane has no geometric meaning in the 3D projective space. We define an algebraic error function to measure the consistency of a pair of projective structures by using the proposed constraint:

$$d_G(\tilde{P}_{12}, \tilde{P}_{23}) = \tilde{P}_{23}^{T\psi} G \tilde{P}_{12} | \cdot \psi \tag{30}$$

If $d_{G\psi} = 0$, then the two projective structures are consistent with the G matrix and the corresponding point is static. Otherwise, the 3D point is moving.

The matrix G encapsulates the normal vectors of two reference planes, the camera's relative orientation, and some unknown scale factors. It directly relates the pair of projective structures from views (18, 19) and (19, 20) without knowing the camera configuration and the plane position. If the two reference planes are identical, then G is still valid and can be applied.

G is essentially a three-view geometric constraint, as each projective structure relates a pair of corresponding pixels. In this sense, the structure consistency constraint can be considered as the combination of one trilinear constraint and two planar homographies. Furthermore, it can be extended to four views (i, i$\psi$+1) and (j, j$\psi$+1), where i$\psi \neq$ j. The projective structures of the same point in the scene are obtained as $\tilde{P}_{j,j+1}$ from views (i, i$\psi$+1) from views (j, j$\psi$+1). As long as the two pairs of views share the same scene, there exists a bilinear relationship $G_{i,j\psi}$ between $\tilde{P}_{i,i+1}$ and $\tilde{P}_{j,j+1}$, Both the trilinear constraint and the structure consistency constraint exploit the information from three views to detect the moving objects. They are capable of detecting most of the degenerate cases mentioned in the previous section. However, there still exists a subset of degenerate cases that cannot be detected, should both of the following conditions be satisfied: 1) The camera and the objects are moving in the same direction and 2) their velocities satisfy a constant proportional relationship. Fortunately, this subset happens much less frequently than the whole set of degenerate motion.

Figure 11:
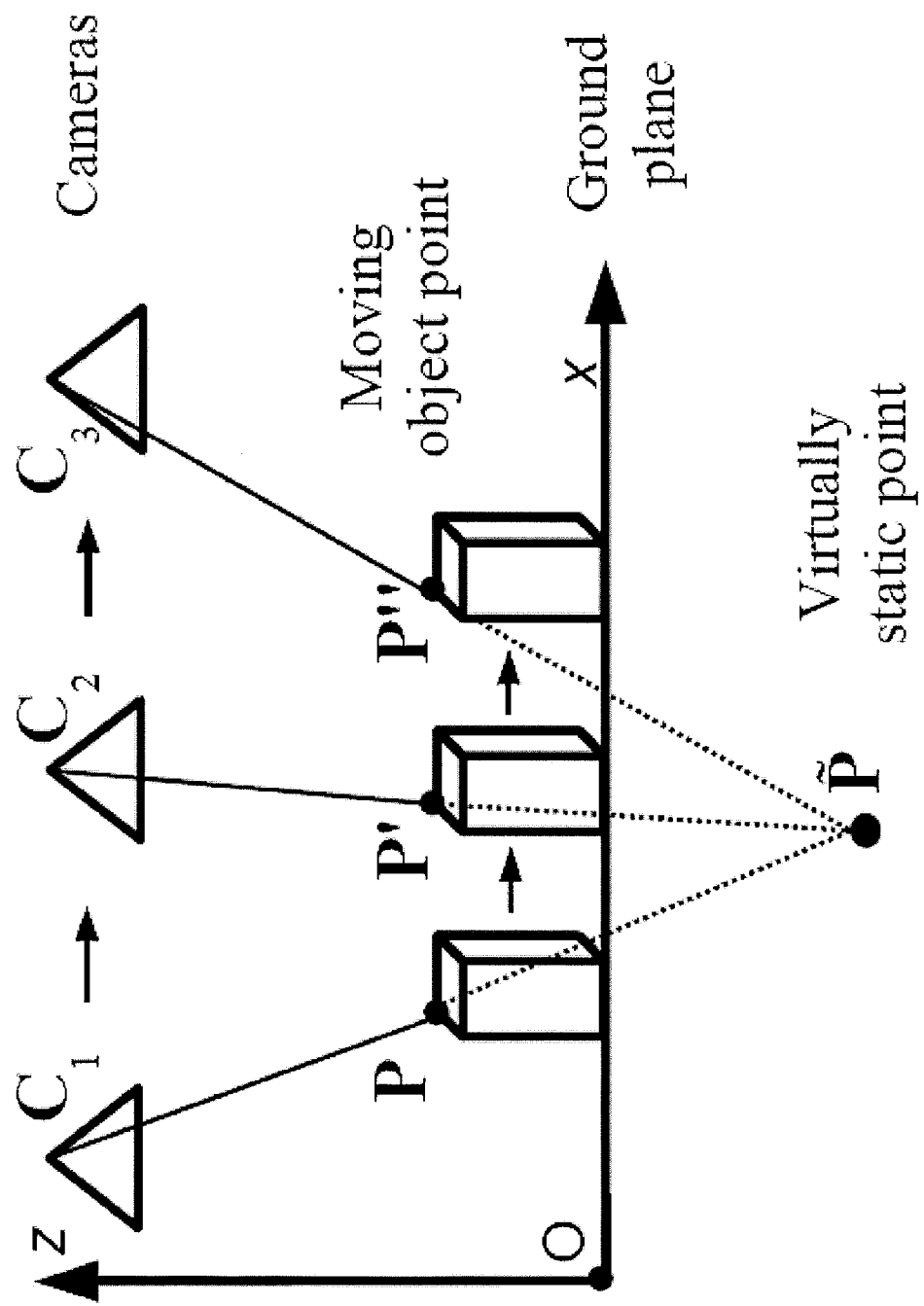
FIG. 11 shows an example of a camera tracking a moving point across three views.

FIG. 11 shows an example of a camera tracking a moving point across three views. Both the camera and the point are assumed to be located in the same 3D vertical plane y=0 in the world coordinate and both move in the direction parallel to the plane z$\psi$=0, which is an extreme case of degenerate motion.

Let $C_i(x_{ci}, 0, z_c) \overset{T\psi}{\leftarrow}$ denote the camera position in view i=(i$\psi$=1, 2, 3) Let $P(x_p, 0, z_p)$, $P'(x'_p, 0, z_p)$, and $P''(x''_p, 0, z_p) \leftarrow$ denote, respectively, the point position in each view. A virtual point $\tilde{P}(\tilde{x}, \emptyset, \tilde{z})$ is obtained by intersecting 3D rays $\overrightarrow{C_1 P}$, $\overrightarrow{C_2 P'} \leftarrow$ and $\overrightarrow{C_3 P''} \leftarrow$ which is indeed a 3D point triangulation process.

There exists a proportional relationship from the two similar triangles $\Delta \tilde{P} P P^{1-}$ abd $\Delta \tilde{P} C_1 C_2$:

$$\frac{z_{c\psi} - \tilde{z}}{z_{p\psi} - \tilde{z}} = \frac{x_{c2} - x_{c2}}{x'_{p\psi} - x_{p\psi}} \cdot \psi \tag{31}$$

If the point motion between views 2 and 3, $x''_{p\psi} - x'_p$, also satisfies this proportional relationship, $$\frac{z_{c\psi} - \tilde{z}}{z_{p\psi} - \tilde{z}} = \frac{x_{c3} - x_{c2}}{x''_{p\psi} - x'_{p\psi}} \cdot \psi \tag{32}$$

then the static virtual point $\tilde{P}$ has the same projections as the moving point P''. In this situation, the trilinear constraint cannot determine whether the pixel triplet comes from a static point or a moving one.

The structure consistency constraint is unable to handle this case as well. The plane z$\psi$=0 is assumed to be the reference plane across three views, so the plane normal vector becomes $v = [0,0,1]^T \leftarrow$. The G matrix is simplified to be only related to projective depth as follows:

$$G = \leftarrow \begin{bmatrix} 0 & 0 & 0 & 0 \\ 0 & 0 & 0 & 0 \\ 0 & 0 & 0 & \alpha_1 \\ 0 & 0 & \alpha_2 & 0 \end{bmatrix} \tag{33}$$

Meanwhile, the projective depth values are obtained as $k_{12} = \leftarrow (z_p - 1)/(\alpha_2 z_p)$ and $k_{23} = \leftarrow (z_p - 1)/(\alpha_2 z_p)$. Then, the residual error is $d_{G\psi} = \alpha_1 k_{12} - \alpha_2 k_{23} = 0$, indicating that the pair of projective structures is consistent with the structure consistency constraint, which is contradictory to the ground truth.

The above example shows that there exist some degenerate cases that neither the trilinear constraint nor the structure consistency constraint can handle. This example can be extended to more than one point as long as the motion of the points considered satisfies the proportional relationship defined in (14) and (15). Similarly, the example can be extended to an arbitrary number of views. Fortunately, these cases happen much less frequently in reality, as the proportional relationship is not easily satisfied.

The structure consistency constraint is robustly estimated from pairs of projective structures $(\tilde{P}_{12}{}^j, \tilde{P}_{23}{}^{j\psi})$ across three views. The estimation of the G matrix consists of two steps: First, obtain a linear solution from a set of noisy points by a robust LMedS scheme and then refine it with nonlinear optimization techniques over the inlier points.

Before solving G, data normalization is performed to pairs of projective structures, such that the pixel coordinates and projective depth values are normalized to $[-1, 1, 1]$ and $[0, 1]$, respectively. This normalization step helps reduce numerical errors and increases the robustness of the estimation. Furthermore, G itself is normalized such that $\|G\|=1$.

By reshaping the G matrix into a 16×1 vector g, the bilinear multiplication in (29) is converted to $$q_\psi g = 0, \psi \quad (34)$$

where the elements of $q_{j\psi}$ are computed from those in $\tilde{P}_{12}{}^{j\psi}$ and $\tilde{P}_{23}{}^{j\psi}$. g is obtained by singular value decomposition (SVD) and reshaped into G.

Given $\|G\|=1$, the linear solution to G requires at least 15 pairs of projective structures $(\tilde{P}_{12}{}^{j\psi}, \tilde{P}_{23}{}^{j\psi})$, $j=1, \ldots 15$. In the presence of image noise and erroneous matches, however, using the whole point set will introduce unnecessary errors and greatly influence the accuracy of the estimated G matrix. Therefore, a robust estimation scheme is needed to find the correct G matrix from a set of noisy points.

The Random Sample Consensus (RANSAC) scheme is a common choice, which finds a solution with the largest inlier support. However, RANSAC requires a predetermined threshold to find the inliers. In our case, this threshold is hard to select, since the residual error to the G matrix is not a geometric distance. Instead, the LMedS estimator is used, which does not depend on a threshold for finding inliers.

The LMedS estimator randomly selects 15 pairs of projective structures to compute the G matrix, and computes the median of the squared residual errors over the whole set of projective structures as follows:

$$\text{median} \left| (\tilde{P}_{23}^j)^T G \tilde{P}_{12}^{j\psi} \right|^2 \cdot \psi \quad (35)$$

This process is repeated for a large number of iterations. The G matrix, which minimizes the median residual error, is considered as the correct solution. Any points with their errors smaller than the median error are classified as inlier points, whereas the rest are outliers. An implicit assumption made by the LMedS estimator is that the outlier points take up less than 50 percent of the whole set of points such that the median error reaches its minimum when the correct solution from inlier points is obtained.

The linear method does not exploit the fact that there are only 11 unknown parameters in G. In theory, only 11 pairs of projective structures are sufficient for obtaining a nonlinear solution to G, whereas the linear solution is affected by the redundancy in 15 point pairs.

In order to solve this problem, the linear solution is converted into a compact 11-dimensional parameterization and then refine the parameters by nonlinear optimization methods.

First, an SVD is applied to the G matrix to enforce its rank-2 property. G is decomposed to $U\text{diag}(s_1, s_2, s_3, s_4)V^{T\psi}$, where $S_i(i=1, \ldots, 4)$ are singular values of G listed in a nondescending order. The rectified G is given as $U\text{diag}(s_1, s_2, 0, 0)V^{T\psi}$.

G is then converted into an 11-parameter vector $\bar{g}$, as described in the Appendix. This 11-dimensional parameter vector provides a compact representation of G and removes the linear redundancy. It is refined by the Levenberg-Marquardt (LM) algorithm [19] such that the reconstructed G matrix minimizes the following Mean Squared Error (MSE):

$$\sum_{j\psi} \left| (\tilde{P}_{23}^j)^T G \tilde{P}_{12}^{j\psi} \right|^2 \quad (36)$$

subject to $\|G\|=1$. This error function is computed over the inlier points only, instead of the whole point set.

Two experiments on synthetic data are used to test the stability of the estimation process of the G matrix. The estimated matrix, denoted by $\hat{G}$, is compared to the ground-truth G matrix by an error measure $\epsilon_G(\in[0,2])$ defined as follows:

$$\epsilon_{G\psi} = \min\left\| \frac{\hat{G}}{\|\hat{G}\|} - \frac{G}{\|G\|} \right\|, \left\| \frac{\hat{G}}{\|\hat{G}\|} + \frac{G}{\|G\|} \right\| \cdot \psi \quad (37)$$

Three methods are evaluated in the presence of pixel noise and outliers. The first one is the LMedS-based method, which identifies a set of inlier points. The second method computes a new $\hat{G}$ by least squares fitting to the inlier points. The third one refines $\hat{G}$ by nonlinear fitting based on the same set of inliers. All the three methods are used in each experiment, called "LMedS," "LMedS+Linear," and "LMedS+Nonlinear," respectively.

To generate the synthetic data considered for this test, a moving camera with constant intrinsic parameters and three different poses are synthesized, with both 3D rotation and translation. Second, two different reference planes are randomly selected, which are ensured to be visible to all the cameras. The interframe homographies and epipolar constraints are obtained from the known 3D configuration. Last, two sets of 3D points are randomly generated. The first set contains 500 static off-plane 3D points that project to 2D parallax pixels. The second set consists of points moving in 3D epipolar planes and projected to the pixels moving along the epipolar lines, called degenerate motion pixels. The coordinates of all 2D pixels are generated with the range The first experiment tests how sensitive the G matrix is with respect to the noise in pixel coordinates. Here, only the parallax pixels are used. An independent and identically distributed (i.i.d.) Gaussian noise $n\psi$ is added to the parallax pixels, where $n\sim N(0,\sigma)$ and $\sigma$ is the noise level (standard deviation). The noise level $\sigma\psi$ is gradually increased from 0 to 0.2, which is 20 percent of the original range of pixel coordinates.

The second experiment evaluates the sensitivity of the estimation process to the ratio of inliers over the whole data set.

Here, inliers are parallax pixels and outliers are degenerate motion pixels. The number of motion pixels is gradually increased from 0, whereas the number of parallax pixels is kept constant. Then, the inlier ratio decreases from 100 percent to as low as 30 percent. Each pixel is contaminated with 3 percent noise as well.

Figure 12A:
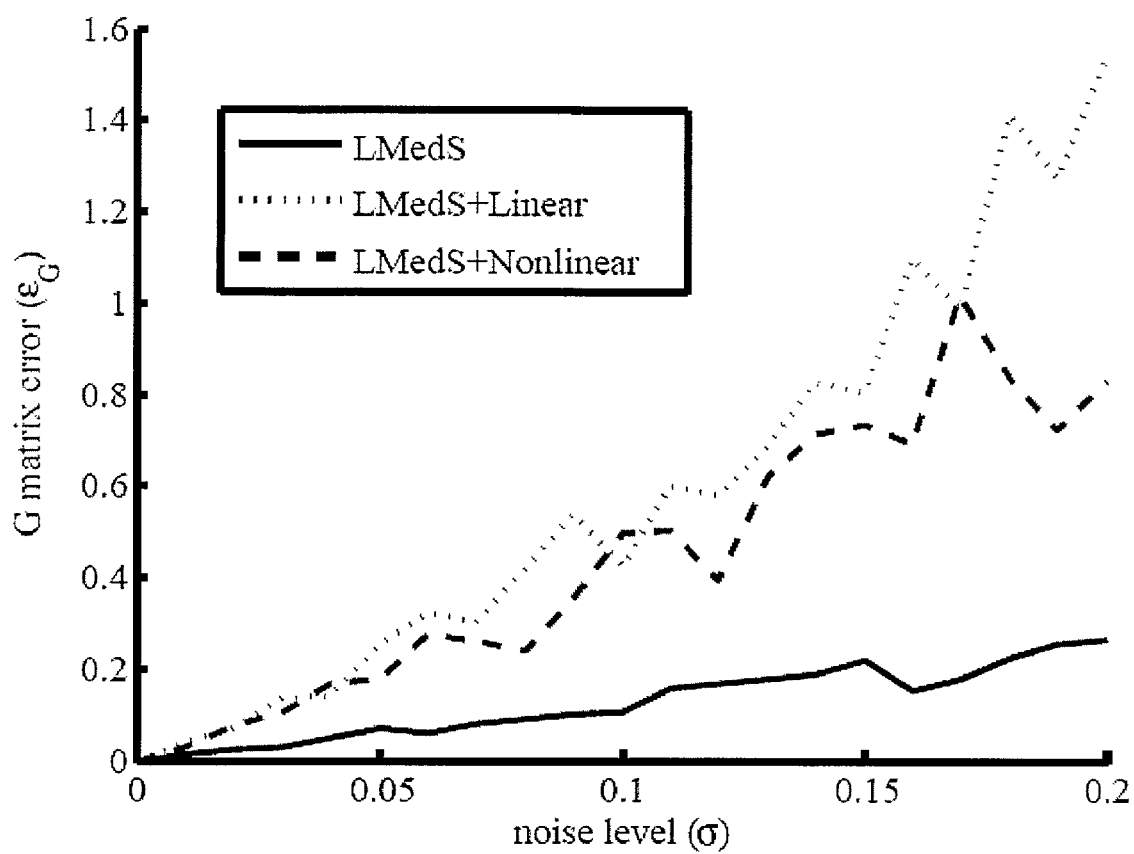
FIG. 12A shows that estimation errors $\epsilon_{G\psi}$ rise as the noise level $\sigma\psi$ increases in an approximate exponential curve.
Figure 12B:
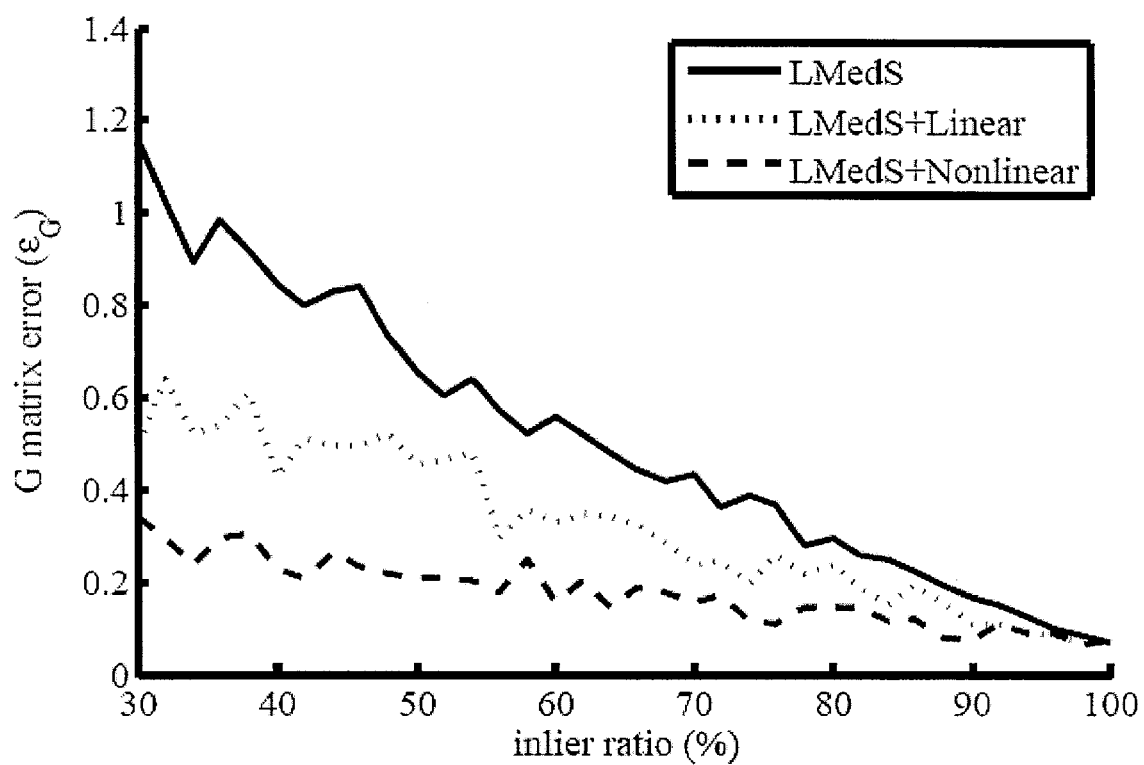
FIG. 12B shows that estimation error drops as the ratio of inlier points increases up to 100 percent.

Both experiments were repeated 100 times to increase the generality, and the results are shown in FIGS. 12A and 12B. The estimation errors $\epsilon_{G\psi}$ rise as the noise level $\sigma\psi$ increases in an approximate exponential curve, as shown in FIG. 12A. Both "LMedS þLinear" and "LMedS þNonlinear" methods gen-erate larger errors than "LMedS," as they fit G more closely to the noisy data. In FIG. 12B, the estimation error drops as the ratio of inlier points increases up to 100 percent. In the presence of outliers, "LMedS þNonlinear" leads to the smallest errors, again due to its ability of fitting more closely to the inlier points.

Based on the experimental results obtained from the synthetic data, the estimation of G is determined to be reliable as long as the pixel noise is below 5 percent and the inlier ratio is above 70 percent. In addition, the "LMedS+Nonlinear" outperforms the other two methods in the presence of noise and outliers. These two analysis are based on perfect interframe homographies and epipolar constraints and the synthesized pixels are uniformly drawn from [−1, 1]. Higher estimation errors are expected if the interframe constraints are noisy and the pixels are aniso-tropically distributed.

In some implementations, techniques are described for detecting motion regions in video sequences observed by a moving camera in the presence of a strong parallax due to static 3D structures. Each image pixel is classified into planar background, parallax, or motion regions by sequentially applying 2D planar homographies, the epipolar constraint, and a structure consistency constraint. The structure consistency constraint is derived from the relative camera poses in three consecutive frames and is implemented within the "Plane-Parallax" framework. Unlike conventional planar-parallax constraints, the structure consistency constraint does not require the reference plane to be constant across multiple views. The structure consistency constraint directly measures the inconsistency between the projective structures from the same point under camera motion and reference plane change. The structure consistency constraint is capable of detecting moving objects followed by a moving camera in the same direction, a so-called degenerate configuration where the epipolar constraint fails.

In some implementations, the structure consistency constraint is implemented as a three-view constraint. The three-view constraint is capable of detecting the degenerate motion that the epipolar constraint cannot detect. Implemented within the "Plane-Parallax" framework the proposed approach is more reliable than the trifocal tensor in the presence of image noise, false matches, and small camera motion. Given the homography and the epipoles between two views, the scene is decomposed into a reference plane and off-plane structures (corresponding to a 2D parallax) in the 3D projective space. The structure consistency constraint is a bilinear relationship between a pair of 3D projective structures corresponding to the same static point. The structure consistency constraint is a parallax rigidity constraint across three views. The structure consistency constraint is represented by a 4×4 matrix that encapsulates the camera motion, the variation of the reference planes, and the camera internal parameters. Derived from generally uncalibrated cases, it can be further simplified to a combination of the normal vectors of the two reference planes if the camera parameters are known. The structure consistency constraint is estimated in a way similar to that of estimating the fundamental matrix. The Least Median of Squares (LMedS) scheme is applied to robustly find a solution with the least median residual errors. The structure consistency constraint is geometrically equivalent to the trilinear constraint, as both of them utilize the relative camera poses from three views. Furthermore, the bilinear constraint can be extended to four views as long as these four views share the same part of the scene.

Figure 13:
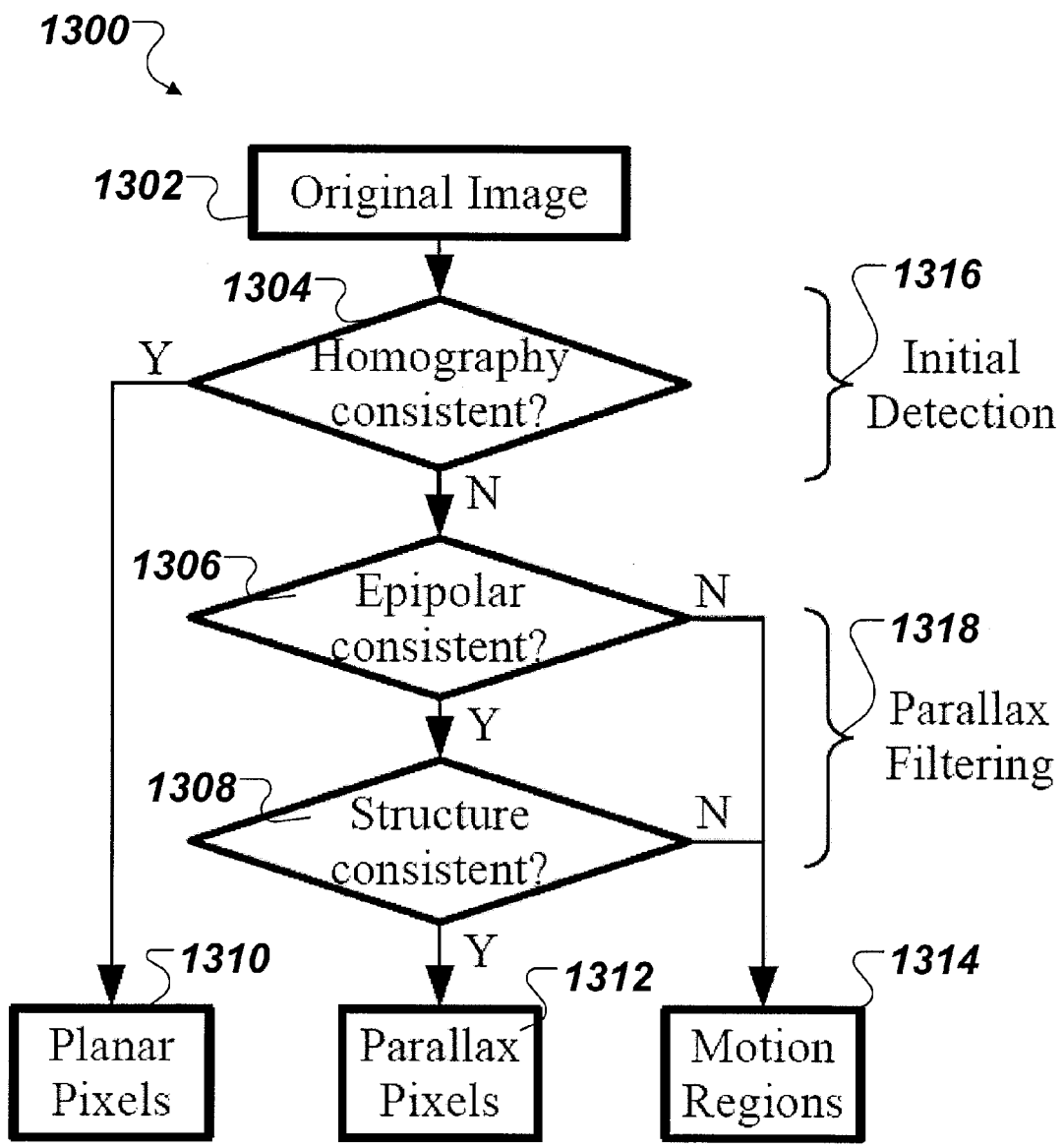
FIG. 13 is a process flow diagram illustrating an example process for detecting and tracking a moving objection in a scene.

FIG. 13 is a process flow diagram illustrating an example process for detecting and tracking a moving objection in a scene. Original image to be analyzed is received/obtained/captured 1302, etc. Homography is used for initial detection 1316, and the original image is initially segmented 1304 into the planar pixels 1310, which are consistent with the homography, and the residual pixels. The residual pixels are processed to reduce/eliminate parallax pixels using parallax-filtering 1318. The epipolar constraint 1306 and the structure consistency constraint 1308 are implemented in combination to separate the parallax pixels 1312 from the independently moving regions 1314. A practical motion detection and tracking system is implemented based on this scheme 1300.

Figure 14:
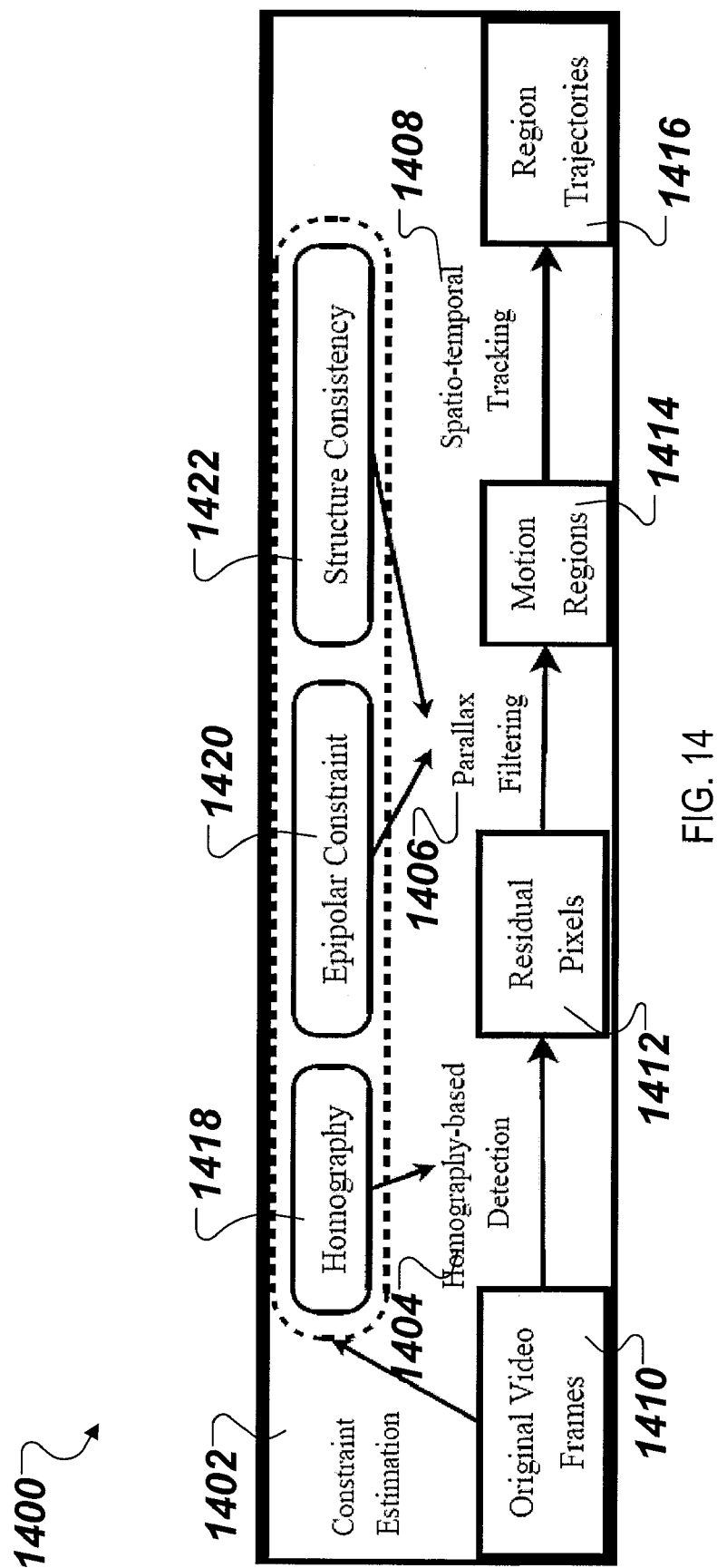
FIG. 14 is a block diagram illustrating an automatic system for detecting and tracking moving objects in video scenes from moving cameras.

FIG. 14 is a block diagram illustrating an automatic system 1400 for detecting and tracking moving objects in video scenes from moving cameras. The system 1400, as shown in FIG. 14, is implemented as a pipeline of four stages: geometric constraint estimation 1402, homography-based motion detection 1404, parallax filtering 1406, and spatio-temporal tracking 1408. The geometric constraint estimation 1402 stage performs a robust estimation of multi-view geometric constraints based on feature point correspondences extracted from the original video frames (video sequences) 1410. Then, a background model image is computed for each frame by homography-based image registration 1404. The pixels inconsistent with the background model are classified as residual pixels 1412. The parallax pixels are filtered out 1406 of the residual pixels 1412 by applying robust outlier detection methods to disparity values with respect to each geometric constraint. Further, the 2D motion regions 1414 obtained from each frame are linked into motion trajectories by a spatio-temporal tracking algorithm 1408.

Figure 15A:
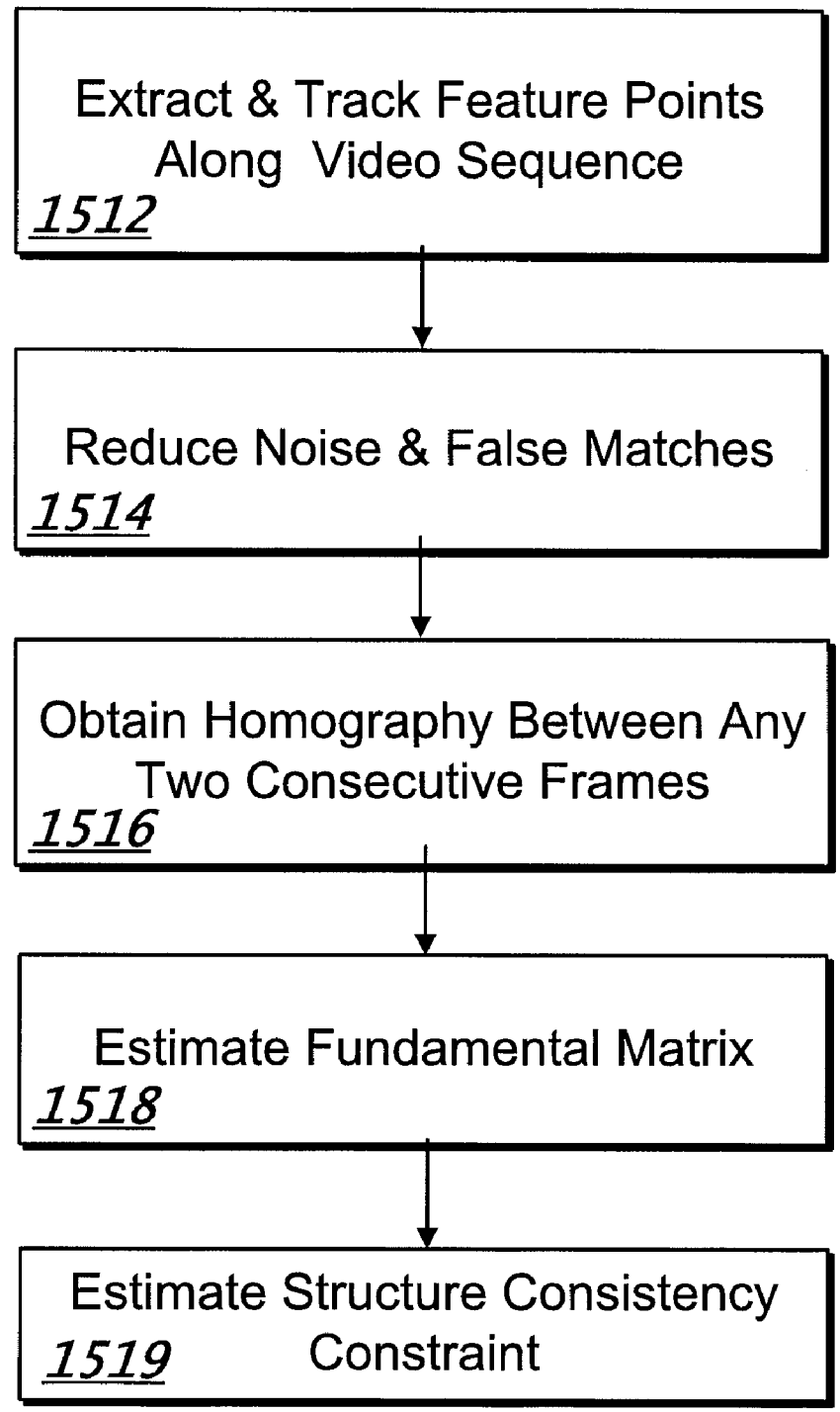
FIG. 15A is a process flow diagram illustrating an example process for performing the first stage of the pipeline, the geometric constraint estimation stage.

FIG. 15A is a process flow diagram illustrating an example process 1510 for performing the first stage of the pipeline 1000, the geometric constraint estimation 1002 stage. The Kanade-Lucas-Tomasi (KLT) feature tracker is applied to extract and track 1512 the feature points along the video sequence (original video frames 1010). The image noise and false matches are alleviated/reduced 1514 by robust sampling schemes. The homography between any two consecutive frames $H_{t+1, t\psi}$ is obtained 1516 by fitting to four point pairs selected by the RANSAC scheme, where t is the frame number. The estimated homography between frames $t\psi$ and $t\psi+1$ corresponds to a reference plane in the scene. In practice, the 2D affine motion model (as describe above with respect to FIGS. 2A, 2B) can be used as a good approximation of homography and requires only three point pairs for estimation. The fundamental matrix is estimated 1518 between frames with larger temporal interval, namely, $t\psi$ and $t\psi+\delta_t$, where $\delta_{t\psi}$ is set to five frames to allow longer camera baseline. $\delta_{t\psi}$ may vary due to different speeds of camera motion. The fundamental matrix is computed by a Plane+Parallax approach based on the homography concatenated from frame $t\psi$ to $t\psi+\delta_t$. Similarly, the structure consistency constraint is estimated 1519 among frames t, $t\psi+\delta_t$, and $t\psi+2\delta_t$.

Figure 15B:
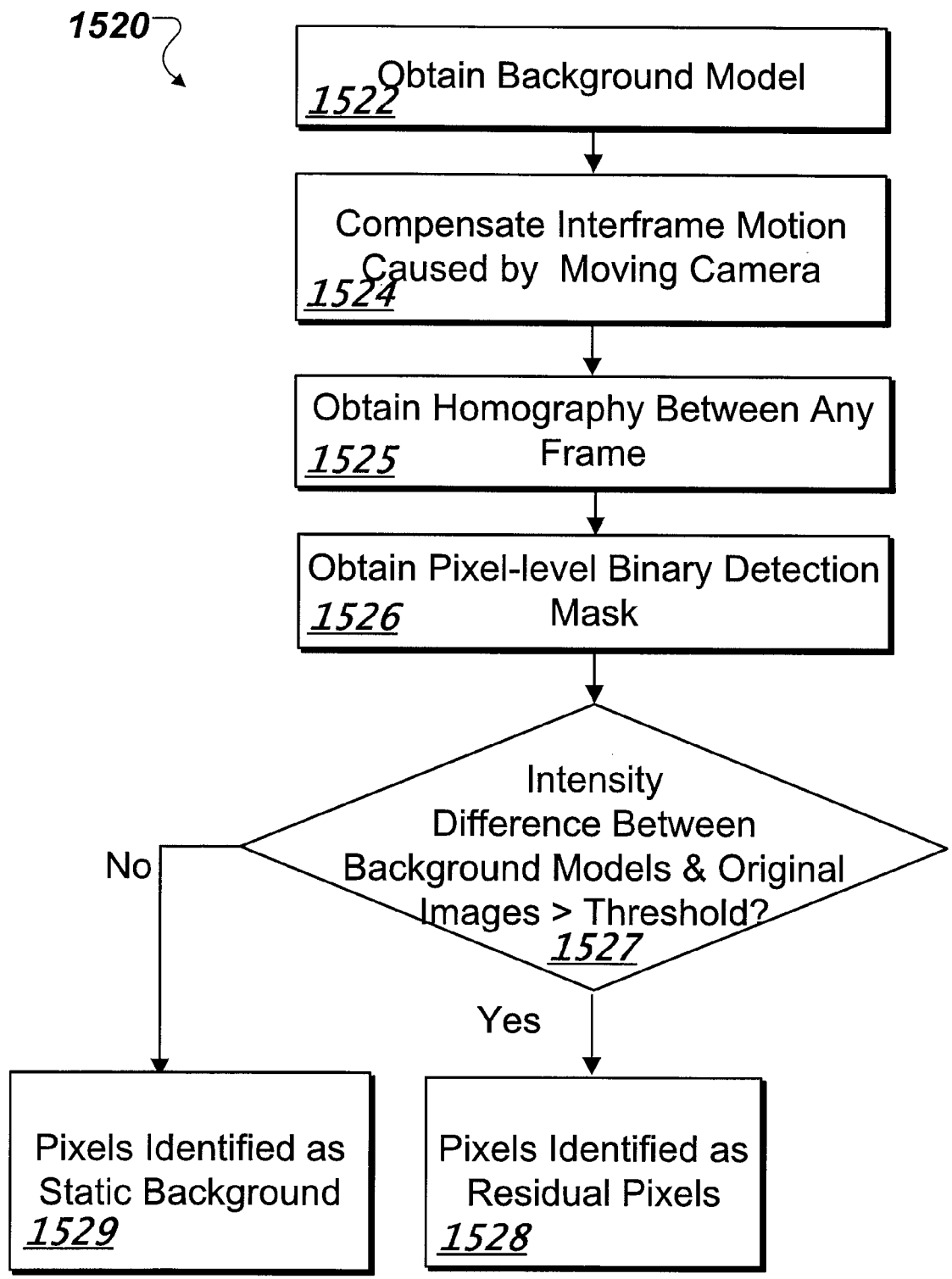
FIG. 15B is a process flow diagram illustrating an example process for performing the second stage of the pipeline, Homography-Based Motion Detection.

FIG. 15B is a process flow diagram illustrating an example process 1520 for performing the second stage of the pipeline, Homography-Based Motion Detection 1004. Consider a reference video frame $t_0$. The background model is obtained 1522 by registering the images within a sliding temporal window $W_{detect\psi}(t_0)=[t_0-\Delta_{detect}; t_0+\Delta_{detect\psi}]$ to the reference frame $t_0$, where $\Delta_{detect\psi}$ is the temporal window size. For any pixel $p_{t0}$ in the frame $t_0$, let $p_t$ denote its corresponding pixel in frame. $t\psi \in W_{detect\psi}(t_0)$.

A background model for $P_{t0}$ in frame $t_0$ is obtained by fitting to a model from the set of corresponded pixels $\{I(P_{t_0\Delta dectect\psi}), \ldots, I(P_{t_0}), \ldots, I(P_{t_0+\Delta dtect\psi})\}$, where $I(P_t)\leftarrow$ denotes the image intensity of pixel p in frame t. The mode of pixel intensities is used to represent the background model. In some implementations, other back-ground models such as the Gaussian mixture model can be implemented.

The interframe motion caused by the moving camera is compensated 1524 by the homographies from any frame $W_{detect\psi}(t_0)$ to the reference frame $t_0$, $p_{t\psi} \sim H_{t,t_0} p_{t_0}$. This is a typical image registration process that warps all the frames within the window to the reference frame. The homography-based detection 1004 avoids finding dense optical flows between consecutive frames that are more time consuming and sensitive to image noise.

The homography $H_{t_0, t\psi}$ from any frame $t\psi \in W_{detect\psi}(t_0)$ to frame $t_0$ is obtained 1525 by concatenating the homographies between consecutive frames as follows:

$$H_{t_0,t\psi} = \begin{cases} H_{t_0,t_0+1} \ldots H_{t1,t\psi} & \text{if } t\psi \geq t_0 \\ H_{t_0,t_0 1} \ldots H_{t,t1} & \text{if } t < t_0 \cdot \psi \end{cases} \quad (38)$$

In order to overcome the accumulated errors of these concatenated homographies, they can optionally be further refined by a Bundle Adjustment method, which minimizes the prediction errors by the LM algorithm over the whole set of inlier points within the temporal window. After the background model is estimated, a pixel-level binary detection mask is obtained 1526 by comparing the back-ground model to the original frame: A determination is made 1527 on whether the intensity differences between background models and original images are larger than a threshold. Those pixels with intensity differences larger than the threshold $\sigma_{detect\psi}$ are identified 1528 as residual pixels, whereas those below the threshold are identified 1529 as belonging to the static background. $\sigma_{detect\psi}$ controls how largely the intensity differences between background models and original images are tolerated. The threshold can be adjusted to identify more (lower threshold) or less (higher threshold) residual pixels.

Figure 15C:
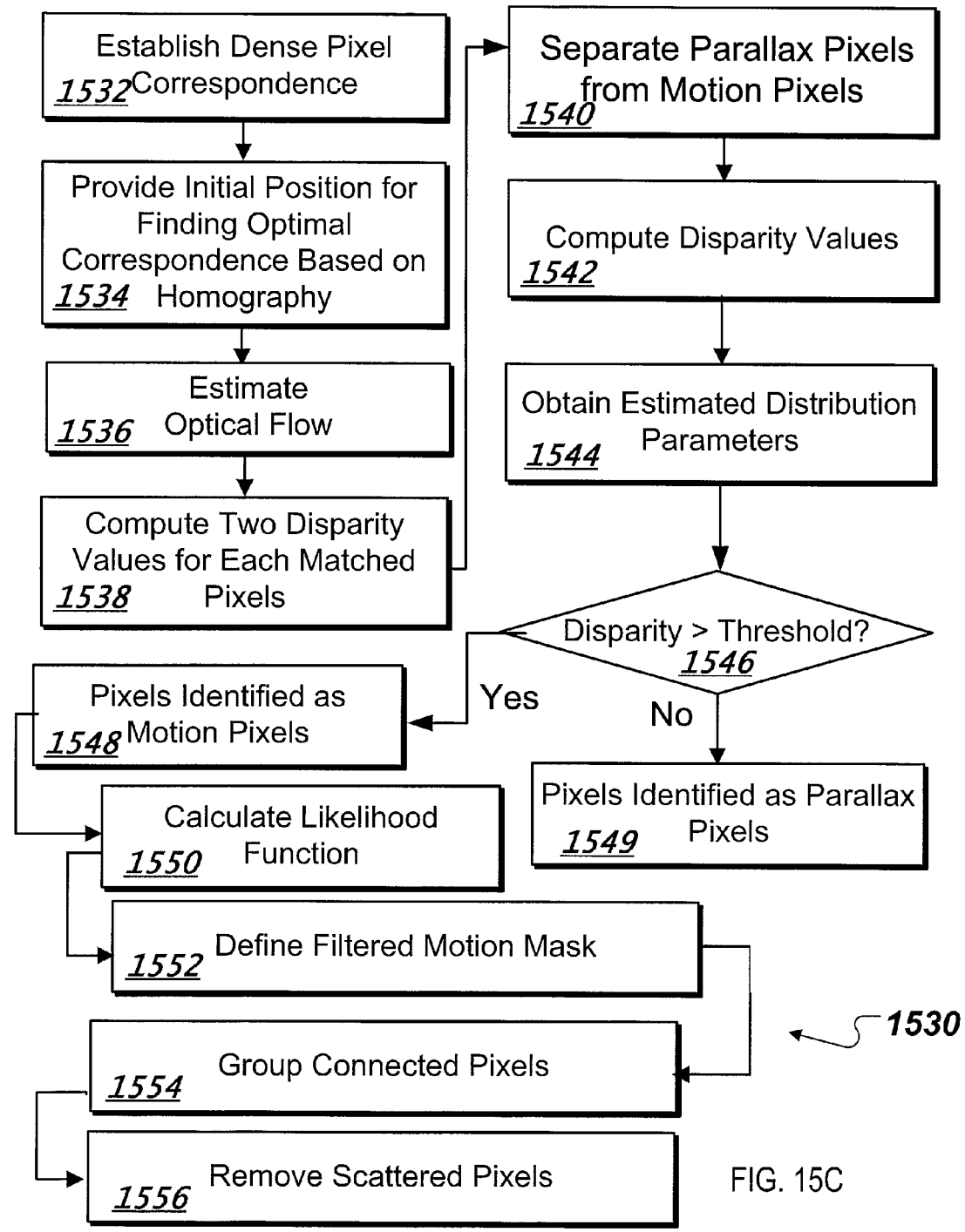
FIG. 15C is a process flow diagram of an example process for performing Parallax Filtering, the third stage of the pipeline.

FIG. 15C is a process flow diagram of an example process 1530 for performing Parallax Filtering, the third stage of the pipeline 1000. Before filtering the parallax pixels, dense pixel correspondences (or optical flow) are established 1532 between the residual pixels in frames $t\psi+\delta_t$, and $t\psi+2\delta_t$. The number of residual pixels is much smaller than that of the whole image, which reduces the computation load. The homography between two frames is used to provide 1534 an initial position for finding the optimal correspondence. Then, the optical flows are estimated 1536 by finding the corresponding pixels with maximum normalized cross correlations between image windows. For each pair or triplet of matched pixels, two disparity values are computed 1538: $d_{epi\psi}$ from the epipolar constraint, and $d_{G\psi}$ from the structure consistency constraint. These two disparity values are used in a two-step parallax-filtering process, as shown in FIG. 13, to determine whether a pixel corresponds to motion or to parallax. At each filtering process, various robust statistics techniques are applied 1540 to separate the parallax pixels from the motion pixels.

Figure 16:
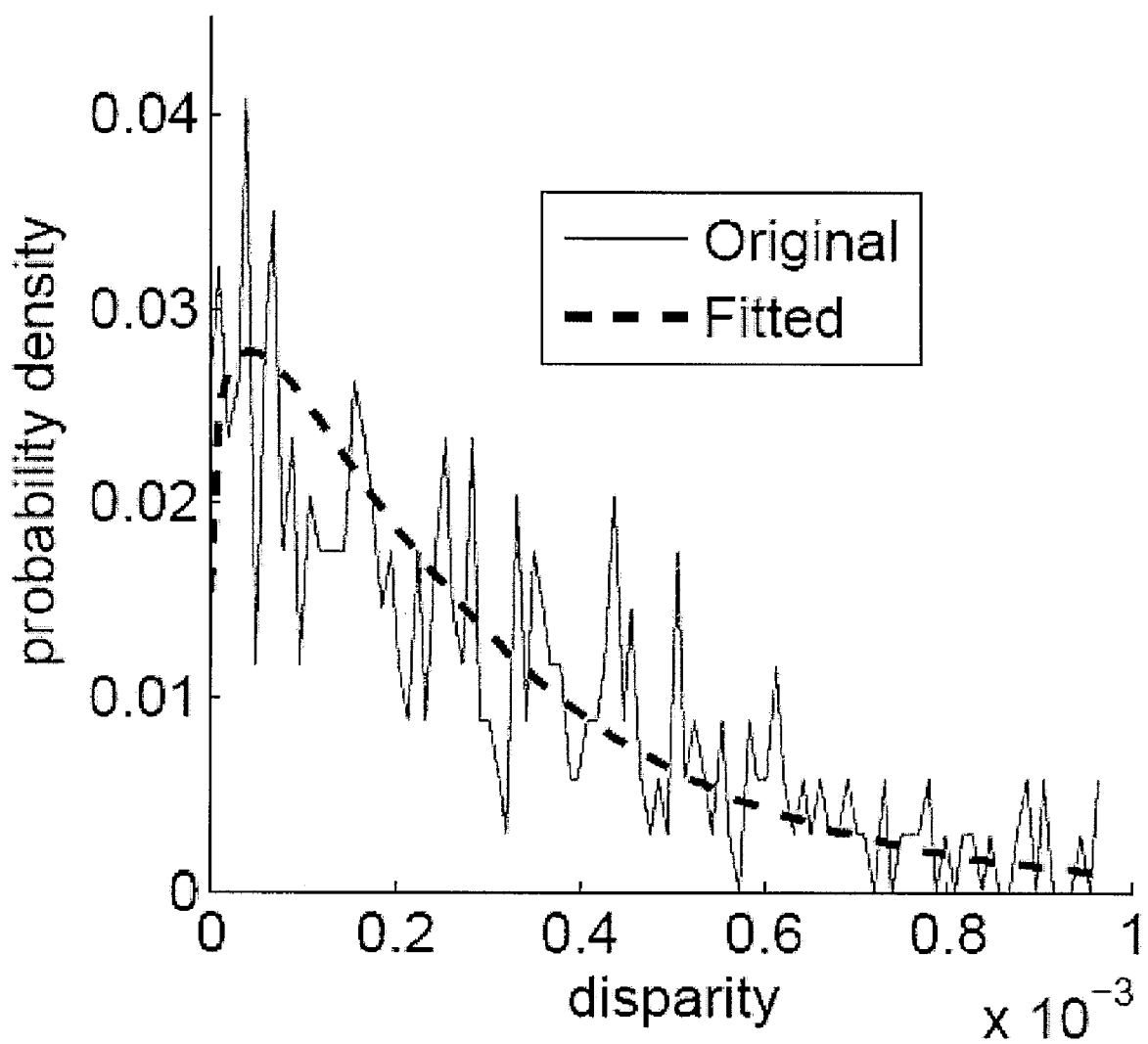
FIG. 16 shows a typical histogram of the disparity values with respect to the structure consistency constraint (solid line) and the probability density function values of the fitted $x^2$ distribution (dashed line).

Since all the geometric constraints are computed from noisy image feature points, it is necessary to predict the distribution of disparity values. An assumption is made that the image-measurement noise of feature points in both x and y-directions satisfy a one-dimensional Gaussian distribution $N(0,\sigma)$, where $\sigma$ is the standard deviation. The disparity values are then assumed to satisfy a $x^2(K, \sigma)$ distribution, as they are computed 1542 from a quadratic form $p_2^T A p_1$, where k is the degree of freedom. FIG. 16 shows a typical histogram 1600 of the disparity values with respect to the structure consistency constraint 1610 (solid line) and the probability density function values of the fitted $x^2$ distribution 1620 (dashed line). Referring back to FIG. 15C, parameters of the $x^2$ distribution, namely, $\sigma\psi$ and k, are obtained 1544 by the maximum likelihood estimation (MLE) based on prediction errors over the feature points. Disparity values are compared 1546 with a threshold. With the estimated distribution parameters, any pixels whose disparity is greater than $3\sigma$ are treated 1548 as outliers that is, motion pixels. Those that doe not exceed the threshold are treated 1549 as parallax pixels. This threshold can be adjusted to be smaller/lower or larger/bigger depending on whether more or less motion pixels are desired to be included. However, a smaller threshold can cause the number of mis-detected parallax pixels to increase. Due to estimation errors and noise, the filtered pixels may still contain a small amount of parallax pixels In order to discriminate these two kinds of pixels, a likelihood function is defined 1550 for each motion pixel based on the disparity of pixel $p_t$:

$$L(p_t) = 1 - \frac{1}{2}\left(e^{\lambda_{epi} d_{epi\psi}} + e^{\lambda_G d_{G\psi}}\right), \psi \quad (39)$$

where $\lambda_{epi\psi}$ and $\lambda_{G\psi}$ control how much the likelihood changes with respect to disparity. In this manner, the true-positive motion pixels are assigned with higher likelihood, whereas those false-positive parallax pixels correspond to lower likelihood. The filtered motion mask images are further refined 1552 by standard morphological operations such as erosion and dilation. Connected pixels are grouped 1554 into compact motion regions, whereas scattered pixels are removed 1556.

The fourth stage of the pipeline is the spatio-temporal tracking 1008 process. Moving objects are tracked by taking the image appearance, 2D motion vectors, and motion likelihood of these regions as its observation and linking similar regions into object trajectories. Spatio-temporal tracking is substantially the same as described above.

Performance of the detection and tracking system 1000 as described in this specification on a number of real-world video sequences are described in FIGS. 17A, 17B, 17C, 17D, 17E, 17F, 17G, 17H, 17I, 17J, 17K, 17L, 18A, 18B, 18C, 19A, 19B, 19C, 20A, 20B, 20C, 21A, 21B, 22A, 22B. In these figures, the camera undergoes general rotation and translation. Both qualitative and quantitative results demonstrate the effectiveness and robustness of the detection and tracking system 1000

Figure 17A:
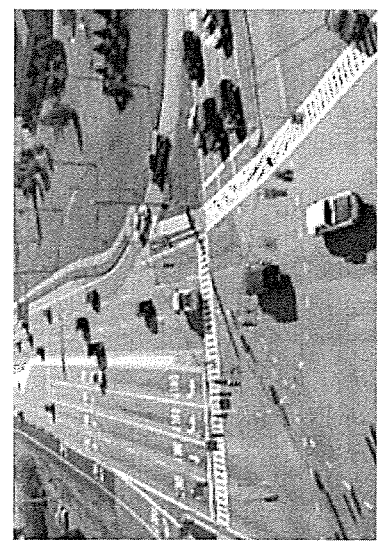
FIGS. 17A, 17B, 17C, 17D, 17E, 17F, 17G, 17H, 17I, 17J, 17K, 17L show a qualitative evaluation of the detection and tracking system.
Figure 17B:
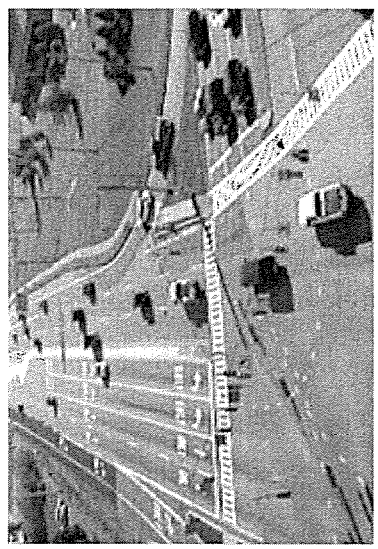
Figure 17C:
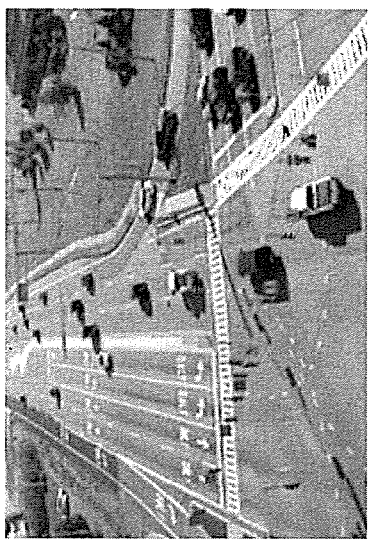
Figure 17D:
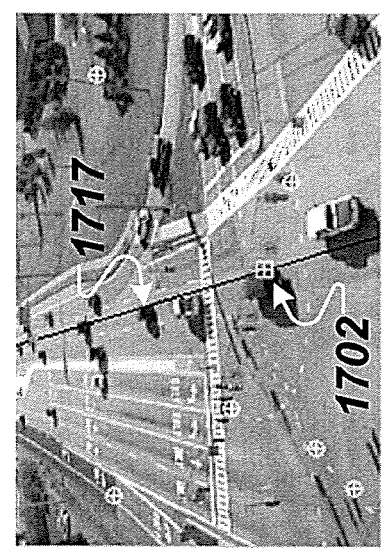
Figure 17E:
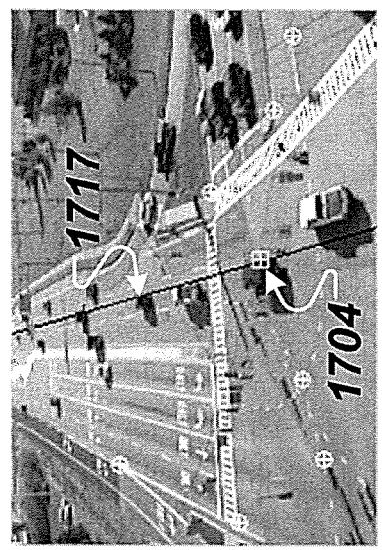
Figure 17F:
Figure 17G:
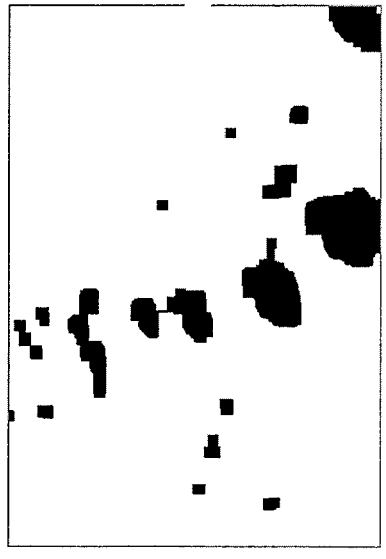
Figure 17H:
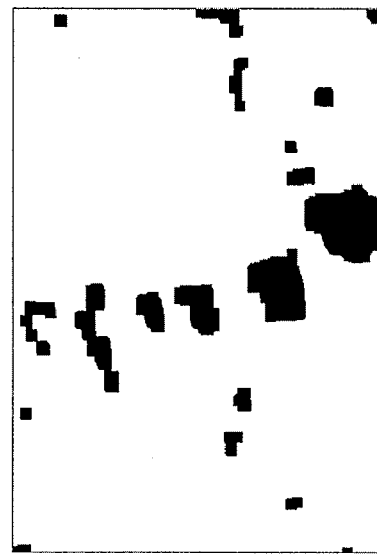
Figure 17I:
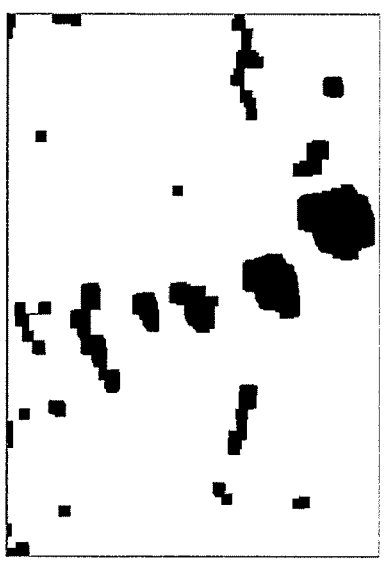
Figure 17J:
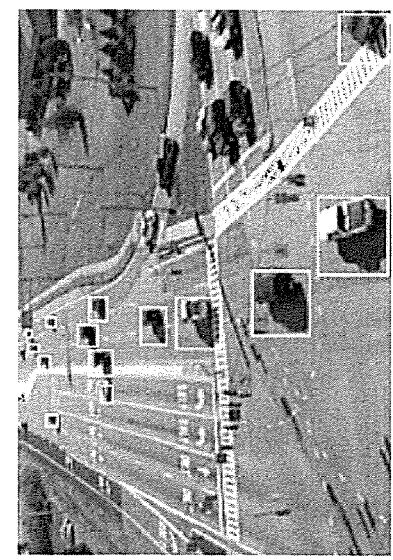
Figure 17K:
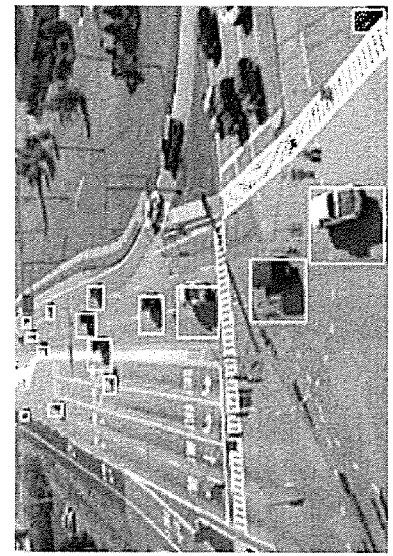
Figure 17L:
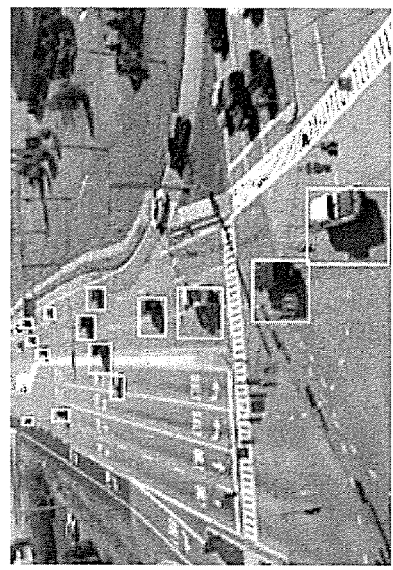

FIGS. 17A, 17B, 17C, 17D, 17E, 17F, 17G, 17H, 17I, 17J, 17K, 17L show a qualitative evaluation of the detection and tracking system 1000. Detection and tracking results of a video sequence, called the "road" sequence is shown. A number of vehicles on the road are followed by an airborne camera moving in the same direction, as shown in the three original frames in FIGS. 17A, 17B and 17C. This is a typical example of a degenerate motion. The insufficiency of the epipolar constraint is illustrated in FIGS. 17D and 17E. The measured pixels 1702, 1704 (marked with white squares) on the moving vehicle lie exactly on the epipolar lines 1712, 1714 (dark lines). This degenerate motion cannot be effectively detected by the epipolar constraint. Also shown in FIGS. 8d and 8e is the variation of the reference plane. In both figures, the feature points that are most consistent with the homography are marked with white circles, which roughly indicate the position of the reference plane in the scene. FIGS. 17D and 17E shows the reference plane changing over different frames. In FIG. 17D, the reference plane between frames 55 and 60 is almost overlapped with the ground plane. However, the reference plane between frames 60 and 65 in FIG. 17E is skewed from the ground plane, containing the points on the traffic signs and the bushes on the roadside. The original detection mask for frame 55 is shown in FIG. 17F, where the residual pixels are marked black. The residual pixels include both the moving vehicles and the parallax pixels such as traffic signs and houses on the roadside. The parallax pixels are filtered by a decision-tree-based process described above. The final motion mask images are shown in FIGS. 17G, 17H, and 17I. Notice that more than 90 percent of the moving vehicles are successfully detected, as well as some parallax regions. These parallax regions are effectively removed in the tracking process and only the moving objects are grouped into object trajectories (FIGS. 17J, 17K, and 17L).

FIGS. 18A, 18B and 18C compare disparity maps with respect to three different geometric constraints: the epipolar constraint, the structure consistency constraint, and the trilinear constraint. The disparity maps are converted into grayscale images, where brighter pixels indicate smaller motion likelihood. One can observe that the disparities for moving objects with respect to the epipolar constraint are even smaller than those for the parallax pixels. Therefore, the epipolar constraint disparity cannot provide useful cues for detecting the degenerate motion. The structure consistency constraint, however, is not affected by the degenerate motion. The disparities for moving objects with respect to the structure consistency constraint are much larger than those for the parallax pixels. FIG. 18C shows that the disparity map is computed with respect to the estimated trilinear constraint. Note that the average inlier error for the estimated trilinear constraint is as large as 5.0 pixels. The corresponding disparity map does not present a useful pattern for parallax filtering, due to the unreliable estimation of the trifocal tensor.

Another video sequence shot by an infrared airborne sensor, called "seq29," is shown in FIGS. 19A1, 19A2, 19A3, 19A4, 19B1, 19B2, 19B3, 19B4, 19C1, 19C2, 19C3 and 19C4. In the sequence, two vehicles make turns beside large buildings and trees. The results of frames 700, 703, and 706 are respectively shown in three rows (from top to bottom). Each row shows the original image 19A1, 19B1 and 19C1, the initially detected residual pixels 19A2, 19B2 and 19C2, the filtered motion regions 19A3, 19B3 and 19C3, and the final detection results 19A4, 19B4 and 19C4 (from left to right). The initial residual pixels 19A2, 19B2 and 19C2 contain a large number of parallax pixels, including building edges, trees, and road curbs. Most of these parallax pixels are effectively removed by parallax filtering, where the filtered motion mask images are much crisper than the original ones. After morphological refinement, only two motion regions are constantly detected in the sequence that largely facilitates the tracking process.

FIGS. 20A1, 20A2, 20A3, 20A4, 20B1, 20B2, 20B3, 20B4, 20C1, 20C2, 20C3 and 20C4 show experimental results of a video sequence shot by a handheld camera, called "Tutor Hall". The camera spans around a building while following a moving vehicle. Among a number of planar surfaces in the scene, the ground plane is automatically selected as reference planes between consecutive frames most of the time. As shown in the residual pixel maps 20A2, 20B2 and 20C2, the building facades are effectively suppressed by multiframe image registration, although they are indeed parallax pixels. Most of the detected parallax pixels belong to the edge of the tall building and road curbs. The parallax-filtering step successfully removed a large amount of these parallax pixels, despite the fact that many parallax pixels lie on the epipolar lines. As a side effect, some parts of motion regions are diminished as well. In addition, the moving vehicle is successfully detected with compact regions after morphological refinement. Further in this sequence, both the epipolar constraint and the structure consistency constraint are estimated with large inlier errors. It may be that the motion of the handheld camera is not large enough compared to the dimension of objects in the scene, especially the tall building.

Figure 21A:
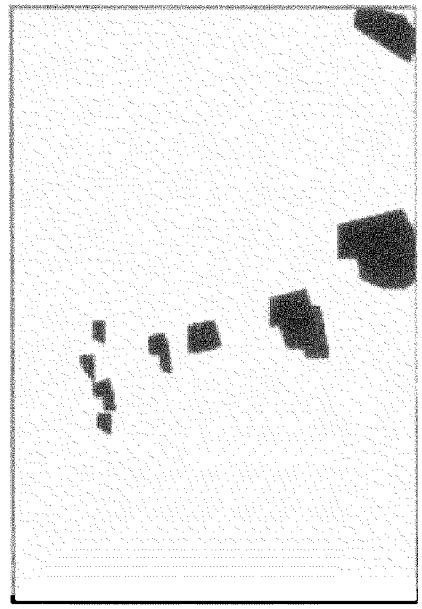
FIGS. 21A and 21B illustrate a quantitative evaluation of the performance of the detection and tracking system.
Figure 21B:

FIGS. 21A and 21B illustrate a quantitative evaluation of the performance of the detection and tracking system 1000. Ground-truth data is manually labeled on the above video sequences. The ground-truth data refer to a number of 2D polygons in each video frame, which approximate the contour of motion regions. The labeled polygons include the shadow regions as well, since our method does not remove object shadows. For each video sequence, more than 60 frames, or 25 percent of the whole sequence, are labeled. FIGS. 21A and 21B show the ground-truth object regions and motion mask image for frame 55 in the "road" sequence.

Based on the ground-truth and detected motion mask images, two area-based metrics are defined to evaluate the system. Let $\psi_{g\psi}^{t}$ denote the set of pixels that belong to ground-truth motion regions in frame $t_\psi$, and $\psi_{d\psi,t}$ denote the set of actually detected pixels in frame t. A recall measure (detection rate) is defined to evaluate how many detected pixels lie in the ground-truth motion regions as $$Rec(t) = \frac{|\Psi_d^{t\psi} \cap \Psi_g^t|}{|\Psi_g^{t\psi}| \leftarrow} \qquad (40)$$

and a precision measure (related to false-alarm rate) to evaluate how many detected pixels are indeed motion pixels as $$Prec(t) = \frac{|\Psi_{d\psi}^{t\psi} \cap \overline{\Psi_g^t}|}{|\Psi_d^t| \leftarrow}, \psi \qquad (41)$$

where |ψ| the number of pixels within ψ and $\overline{\psi}$ is the complement set of ψ. Both measures range between 0 and 1. The higher both measures are, the better the performance of motion detection becomes.

Average recall and precision measures are computed over the labeled video frames to evaluate the performance of our motion detection method. The quantitative evaluation results are shown in Table 2. For each sequence, four different sets of recall/precision measures are listed as the results of different steps: initial homography-based motion detection ("Initial Detection" in the table), parallax filtering with both epipolar and structure consistency constraints ("Epipolar þStructure"), parallax filtering with the epipolar and trilinear constraints ("Epipolar þTrilinear"), and the final morphology-based refinement ("Morph. Refinement"). Let us first compare the effects of different processing steps on the measures. Initial homography-based detection generates the baseline recall and precision. Then, the recall measure is decreased by the parallax-filtering step either by "Epipolar+ Structure" or by "Epipolar+Trilinear," as a number of motion pixels are rejected as parallax pixels. In contrast, the precision measure is increased, since the parallax pixels are gradually removed. The final morphological refinement greatly helps in obtaining compact motion regions and in boosting both measures, as the parallax pixels are more scattered than the motion pixels.

By comparing the measures in the second row and third row of Table 2, the measures obtained by "Epipolar+Trilinear" are identified to be almost always lower than those by "Epipolar+Structure." This provides a quantitative evidence that the structure consistency constraint performs better than the trilinear constraint. The recall of all the video sequences are generally satisfactory, close to or above 90 percent. The precision score depends on how much 3D structure is contained in the scene. The "road" sequence achieves the lowest precision score, as it contains much more parallax than the other two.

Various parameters are involved in the efficient operation of the detection and tracking system 1000. For example, the temporal window size used by homograph-based image registration $\Delta_{detect \psi}$ should be adjusted with various scene configurations, corresponding to different camera motion and object motion. $\Delta_{detect \psi=45}$ works well for a large number of sequences. In other words, a total of 90 frames (3 sec if the frame rate is 30 fps) are adequate for most sequences, leading to satisfactory recall and precision measures.

Figure 22A:
FIGS. 22A and 22B show the motion mask image for frame 45 in the "Tutor Hall" sequence, which is detected with a small window size being 15 frames.
Figure 22B:
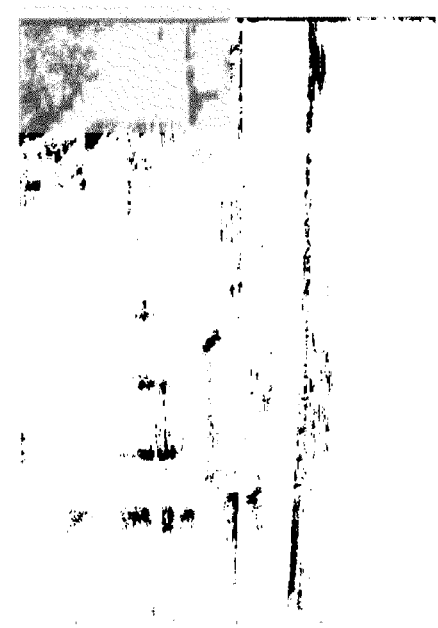

FIGS. 22A and 22B show the motion mask image for frame 45 in the "Tutor Hall" sequence, which is detected with a small window size being 15 frames. Compared to the original residual pixels in 20A1, 20A2, 20A3, 20A4, 20B1, 20B2, 20B3, 20B4, 20C1, 20C2, 20C3 and 20C4, the moving vehicle is not correctly segmented, as the image registration process fails to identify the background pixels within the shorter temporal window. The second one, that is, the image difference threshold $\sigma_{detect \psi}$, is set at a low value, for example, 30 out of 255. The threshold needs to be adjusted to different scene configurations in order to include all the possible motion pixels and enough parallax pixels as well. If the threshold is set too high, then the motion regions may not be fully detected, as shown in FIG. 22B. The third one, that is, the temporal interval $\delta_t$, is used for the estimation of epipolar constraint and structure consistency constraint, which is currently set to be 5. If the camera motion is rather small, then this interval needs to be increased for a stable estimation of geometric constraints.

Among others, techniques and systems are described for detecting moving objects in video sequences viewed from moving cameras. Multiple geometric constraints are used for motion detection in two or three views. In addition, the structure consistency constraint is implemented to relate the projective structures of a static point among three views within the "Plane+Parallax" framework, in the presence of camera motion and variation of the reference plane. The geometric constraints can be integrated into a practical system for detecting and tracking moving objects observed by a moving camera. The encouraging experimental results demonstrate the effectiveness and robustness of the techniques and system. The subject matter described in this specification can be implemented to provide motion detection and tracking tasks on video sequences, with the following characteristics: 1. the scene contains enough texture areas for extracting feature points; 2. the interframe camera motion can be well approximated by homography mapping either distant scenes or scenes with a dominant plane. 3. the scene contains either no parallax (perfectly planar scene) or a strong parallax (a fairly large amount of parallax is needed for reliable estimation of geometric constraints); 4. neither the camera nor the objects move abruptly. These assumptions are similar to those made in previous motion detection approaches In some implementations, automatic estimation of the parameters (such as temporal window sizes and the intensity difference threshold for different video sequences or even different segments in the same sequence) can be implemented. This could be done by integrating the motion segmentation approaches on the sparse feature points before performing the pixel-level motion detection. If the camera projection matrices are known or obtained by self-calibration techniques, then both the static background and the moving objects can be reconstructed and aligned together in the 3D Euclidean space.

Let $\Pi_1$ be the reference plane selected between views 1 and 2, with its plane equation being $N_1 \cdot P_1 = d_1$. The projective depth of $P_1$ between views 1 and 2 $k_{12}$ is rewritten as follows $$k_{12} = \frac{z_0}{H_0} \frac{N_1^{T \psi} P_1 - d_1}{z_1} = \frac{v_1^T P_1 - 1}{\alpha_z z_2}, \psi \quad (42)$$

where $v_1$ is the normal vector of $\Pi_1$ scaled by $1/d_1 \cdot \alpha_1 = H_0/(d_1 z_0)$ is a constant scale factor between views 1 and 2, determined by the unknown off-plane point $P_0$. The projective structure of $P_1$ between views 1 and 2 is obtained as $\tilde{P}_{12} = (p_1, k_{12})$.

Similarly, suppose $\Pi_2$ is the reference plane selected between views 2 and 3, with its plane equation being $N_2 \cdot P_2 = d_2$. The projective depth $k_{23}$ between views 2 and 3 is obtained as $$k_{23} = \frac{v_2^T P_2 - 2}{\alpha_z z_2}, \psi \quad (43)$$

where v2 is the scaled normal vector of $\Pi_2$, and $\alpha_2$ is the scale factor between views 2 and 3. The projective structure of $P_2$ between views 2 and 3 is obtained as $\tilde{P}_{23} = (p_2, k_{23})$.

For simplicity, the camera intrinsic parameters $K_{i\psi}$ is assumed to be I, which does not affect the relative projective structure. Therefore, $z_i p_{i\psi} = K_i P_{i\psi}$ is simplified to be $z_i p_{i\psi} = P_i$. By substituting this into (42) and (43), the reciprocals of $z_1$ and $z_2$ are expressed as the inner products of the projective structures with the scaled plane normal vectors as follows:

$$z_1^{-1} = v_1^{T \psi} p_1 - \alpha_1 k_{12} = \leftarrow [v_1^{T \psi} - \alpha_1] \tilde{P}_{12}, \psi \quad (44)$$

$$z_2^{-1} = [\leftarrow v_2^{T \psi} - \alpha_2] \tilde{P}_{23} \cdot \psi \quad (45)$$

Let $r_z^{T \psi}$ denote the third row of rotation matrix $R_2$ and $t_{z \psi}$ the third component of translation vector $T_2$. The Euclidean depth of point $P_2$ could be related to that of $P_1$ by extracting the third row in $P_2 = R_2 P_1 + T_2$ as $$z_2 = z_1 (r_z^{T \psi} p_1) + t_z \psi \quad (46)$$

By substituting (44) and (45) into (46), the resulting equation (47) is produced.

$$v_1^{T \psi} p_1 - \alpha_1 k_{12} = (v_2^{T \psi} p_2 - \alpha_2 k_{23})[(r_2^{T \psi} + t_z v_1^{T \psi}) p_1 - t_z \alpha_1 k_{12}] \cdot \psi \quad (47)$$

By rewriting each side of (47) as the inner products, the following is obtained $$LHS = \tilde{P}_{23}^{T\psi}\begin{bmatrix}0\\0\\1\\0\end{bmatrix}[v_1^{T\psi}-\alpha_1]\tilde{P}_{12},$$

$$RHS = \tilde{P}_{23}^{T\psi}\begin{bmatrix}v_2\\-\alpha_2\end{bmatrix}\left[(r_{z\psi}^T+t_zv_1^{T\psi})-\alpha_1 t_{z\psi}\right]\tilde{P}_{12}\cdot\psi$$

After moving the left-hand side to the right, the following is produced $$\tilde{P}_{23}^{T\psi}G\tilde{P}_{12}=0,\psi \quad (48)$$

where G is a 4__4 matrix relating the two projective structures of the same 3D point. G can be expressed in details as follows:

$$G = \begin{bmatrix} v_{2x}w^{T\psi} & -v_{2x}t_z\alpha_1 \\ v_{2y}w^T & -v_{2y}t_z\alpha_1 \\ v_{2v}w^{T\psi}-v_1^{T\psi} & -(v_{2z}t_{z\psi}-1)\alpha_1 \\ -\alpha_2 w^{T\psi} & -\alpha_2 t_z\alpha_1 \end{bmatrix},\psi \quad (49)$$

where $v_1(v_{1x}, v_{1y}, v_{1z})^T$ and $v_2(v_{2x}, v_{2y}, v_{2z})^T$ are the scaled normal vectors of the two reference planes and $w=r_z+t_z v_1$.

G is a rank-2 matrix, since $\alpha_{i\psi}\neq 0$, $v_{i\psi}\neq 0$, and i=1,2. It absorbs two plane normal vectors ($v_1$ and $v_2$, three unknowns from each), the third row of camera rotation ($r_z$, two unknowns), the third component of camera translation ($t_z$, one unknown), and two unknown scale factors ($\alpha_1$ and $\alpha_2$), for a total of 15 unknowns. More knowledge about the camera motion or the plane positions can help simplify the G matrix. For instance, if $tz_\psi=0$, then G is simplified to be $$G = \begin{bmatrix} v_{2x}r_z^{T\psi} & 0 \\ v_{2y}r_z^{T\psi} & 0 \\ v_{2z}r_z^{T\psi}-v_1^{T\psi} & \alpha_1 \\ -\alpha_2 r_z^{T\psi} & 0 \end{bmatrix}\cdot\psi \quad (50)$$

Since $r_z^{T\psi}$ is a row from a rotation matrix, there exists an additional constraint $\|r_z\|=1$. Then, $r_z$, $\alpha_2$, $\alpha_1$, $v_{2x}$, and $v_{2,i\psi}$ can be obtained, which reduces the unknowns in G to be 4.

It is not always feasible to recover the parameters such as reference plane positions and relative poses from a given G matrix, as the intrinsic parameters might not be available. Instead, a compact parameterization is desired, as follows, which fully exploits the rank-2 property of the G matrix and removes the linear redundancy. It is always possible to find two columns from G, $g^{(1)}$ and $g^{(2)}$, such that they are linearly independent and have the largest nonzero norms. Then, the original matrix G is converted to a 12-dimensional parameter vector $[g^{(1)}g^{(2)}\leftarrow\lambda_{31}\lambda_{32}\lambda_{41}\lambda_{42}]^T$, where $\lambda_{k1}g^{(1)}+\lambda_{k2}g^{(2)}=g^{(k)}$, k=3,4 respond to the two remaining columns of the original G. If the condition that $\|G\|=1$ is also enforced, then one of the four coefficients, for instance, $\lambda_{42}$, could be solved from other parameters. The final number of parameters is reduced to 11, which is identical to the number of unknown parameters.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A computer-implemented method for detecting motion in a sequence of video frames, the method comprising:
   identifying residual pixels from the sequence of video frames, to provide estimated indication of a moving object or a static three-dimensional (3-D) structure;
   sorting the identified residual pixels to isolate pixels that correspond to the moving object comprising:
      applying at least two geometric constraints to the identified residual pixels, wherein the at least two geometric constraints represent at least a variation in relative depth of the residual pixels;
      detecting a disparity of the residual pixels to the applied at least two geometric constraints; and
      based on the detected disparity, filtering the residual pixels to remove pixels that do not correspond to the moving object; and
   tracking the moving object in the video frames comprising:
      representing the detected disparity in a probabilistic likelihood model;
      accumulating the probabilistic likelihood model within a number of frames during the filtering; and
      based on the accumulated probabilistic likelihood model, extracting an optimal path of the moving object.

2. The method of claim 1, wherein identifying the one or more residual pixels comprises performing affine-based motion compensation and detection on the sequence of video frames.

3. The method of claim 1, wherein identifying the one or more residual pixels comprises performing homography based motion detection.

4. The method of claim 1, wherein tracking a moving object comprises using a spatiotemporal Joint Probability Data Association Filter (JPDAF).

5. The method of claim 1, wherein applying the at least two geometric constraints comprises applying an epipolar constraint including:
   generating a first set of two epipolar lines derived from optical flows;
   generating a second set of two epipolar lines derived from a fundamental matrix; and
   calculating an average angular difference between the first and second sets of epipolar lines to generate an angular difference map.

6. The method of claim 1, wherein, applying the at least two geometric constraints comprises applying a structure consistency constraint including:
   generating at least a pair of relative depth maps for the one or more residual pixels;
   deriving a bilinear relationship between the generated at least a pair of relative depth maps; and
   comparing the one or more residual pixels with the derived bilinear relationship to determine whether the one or more residual pixels conform to the derived bilinear relationship.

7. The method of claim 1, wherein identifying the one or more residual pixels comprises performing affine-based motion compensation and detection that includes:

extracting a number of feature points in each frame of the video data;
matching the feature points in consecutive frames; and
estimating a 2D affine motion model.

8. The method of claim 7, wherein extracting a number of feature points is performed by using the Harris corner detector.

9. The method of claim 7, wherein matching the feature points comprises evaluating a cross-correlation of local windows around the feature points.

10. The method of claim 7, wherein estimating a 2D affine motion model comprises fitting the model to at least three pairs of matched points within a Random Sample Consensus (RANSAC)-based scheme.

11. A computer program product, embodied on a non-transitory computer readable medium, operable to cause a data processing apparatus to perform operations comprising:
identify one or more residual pixels from video data;
apply at least two geometric constraints to the identified one or more residual pixels;
detect a disparity of the one or more residual pixels to the applied at least two geometric constraints;
based on the detected disparity, classify the one or more residual pixels as belonging to parallax or independent motion and filtering the parallax classified residual pixels; and
track a moving object in the video data comprising:
representing the detected disparity in probabilistic likelihood models;
accumulating the probabilistic likelihood models within a number of frames during the parallax filtering; and
based on the accumulated probabilistic likelihood models, extracting an optimal path of the moving object.

12. The computer program product of claim 11, further operable to cause the data processing apparatus to identify the one or more residual pixels by performing affine-based motion compensation and detection on the video data.

13. The computer program product of claim 11, further operable to cause the data processing apparatus to identify the one or more residual pixels by performing homography based motion detection.

14. The computer program product of claim 11, further operable to cause the data processing apparatus to track a moving object comprises using a spatiotemporal Joint Probability Data Association Filter (JPDAF).

15. The computer program product of claim 11, further operable to cause the data processing apparatus to applying the at least two geometric constraints by applying an epipolar constraint including:
generating a first set of two epipolar lines derived from optical flows;
generating a second set of two epipolar lines derived from a fundamental matrix; and
calculating an average angular difference between the first and second sets of epipolar lines to generate an angular difference map.

16. The computer program product of claim 11, further operable to cause the data processing apparatus to apply a structure consistency constraint comprising:
generating at least a pair of relative depth maps for the one or more residual pixels;
deriving a bilinear relationship between the generated at least a pair of relative depth maps; and
comparing the one or more residual pixels with the derived bilinear relationship to determine whether the one or more residual pixels conform to the derived bilinear relationship.

17. A pipeline processing system comprising:
a processor, and
one or more memory devices including one or more programs that cause the processor to control:
a geometric constraint estimation stage to perform an estimation of multi-view geometric constraints based on feature point correspondences extracted from a sequence of video frames;
a homography-based image detection stage to
compute a background model image, and
identify one or more residual pixels in the sequence of video frames based on inconsistencies with the background model; and
a parallax filtering stage to filter out parallax pixels from the residual pixels by applying one or more outlier detection methods to disparity values with respect to each geometric constraint.

18. The system of claim 17, wherein the geometric constraint estimation stage is configured to:
extract or track the feature points along the sequence of video frames;
reduce image noise;
estimate a homography between two consecutive frames in the sequence of video frames; and
estimate a fundamental matrix.

19. The system of claim 17, further comprising linking 2D motion regions obtained from each frame into motion trajectories by a spatio-temporal tracking algorithm.

20. The system of claim 17, wherein the homography-based image detection stage is further configured to detect intensity differences between the background model image and original images are larger than a threshold.

21. The system of claim 17, wherein the parallax filtering stage is configured to define a likelihood function.

22. A method for detecting motion in a sequence of video frames comprising:
identifying from the sequence of video frames pixels associated with an object in actual motion or a static structure in apparent motion;
processing the identified pixels to isolate the pixels associated with actual motion, wherein the isolating comprises:
detecting a variation in relative depth of each of the identified pixels;
based on the detected variation, identifying pixels that exceed a level of variation associated with the static structure; and
filtering out those pixels that do not exceed the level of variation associated with the static structure; and
tracking the object in actual motion in the video frames comprising:
representing the detected variation in a probabilistic likelihood model;
accumulating the probabilistic likelihood model within a number of frames during the filtering; and
based on the accumulated probabilistic likelihood model, extracting an optimal path of the object in actual motion.

23. The method of claim 22, further comprising:
performing homography based motion detection to compensate for motion of a camera used to capture the sequence of video frames.

24. The method of claim 23, further comprising:
detecting an angular difference between epipolar lines.

* * * * *